United States Patent [19]

Ter Veen

[11] 3,740,487

[45] June 19, 1973

[54] INTERCOMMUNICATION AND REMOTE UNIT SELECTION SYSTEM EMPLOYING A MINIMUM OF INTERCONNECTING WIRE

[75] Inventor: William B. Ter Veen, Cincinnati, Ohio

[73] Assignee: Scovill Manufacturing Company, Waterbury, Conn.

[22] Filed: Apr. 5, 1971

[21] Appl. No.: 130,898

[52] U.S. Cl. ..................... 179/37, 179/1 H, 179/2 A

[51] Int. Cl. ............................................ H04m 5/00

[58] Field of Search .................. 179/37, 38, 39, 40, 179/1 H, 17 B, 2 A, 84 SS, 86, 16 AA

[56] References Cited

UNITED STATES PATENTS

| | | | |
|---|---|---|---|
| 3,532,820 | 10/1970 | Holm | 179/1 H |
| 3,576,397 | 4/1971 | Pell | 179/1 H |
| 3,284,571 | 11/1966 | Wittig | 179/2 A |
| 2,812,383 | 11/1957 | Buchner | 179/16 AA |
| 3,476,881 | 11/1969 | Hensbergen et al. | 179/84 SS X |
| 3,215,998 | 11/1965 | Cloyd | 179/37 X |
| 3,435,145 | 3/1969 | Pinault et al. | 179/2 A |

*Primary Examiner*—Thomas W. Brown
*Attorney*—Wood, Herron & Evans

[57] ABSTRACT

A two way intercommunication system for selectively interconnecting one or more central units and individual remote units of an apartment building or the like. Included in the intercom systems are circuit features for providing selectivity, privacy, security and remote control. A basic two-wire embodiment uses two terminal units for two-way communication with the direction of the conversation controlled at the central unit by signals from the selected remote unit. Remote unit selection is made from the central unit. The selection concepts are employed in more sophisticated embodiments to control systems having seperate common audio lines for the remote units. A minimum of interconnecting wire is maintained throughout the different embodiments. Zener diodes are employed to prevent sneak paths and allow for reduction in the amount of wire used without the sacrificing of desirable features.

45 Claims, 12 Drawing Figures

INVENTOR.
William B. ter Veen
BY
Wood, Herron & Evans
ATTORNEYS

INVENTOR.
William B. ter Veen
BY
Wood, Herron & Evans
ATTORNEYS

INVENTOR
William B. ter Veen
By
Wood, Herron & Evans
ATTORNEYS

INVENTOR
William B. ter Veen
BY
Wood, Herron & Evans
ATTORNEYS

INVENTOR
William B. ter Veen
BY
Wood, Herron & Evans
ATTORNEYS

INVENTOR.
William B. ter Veen
BY
Wood, Herron & Evans
ATTORNEYS

INVENTOR.
William B. ter Veen
BY
Wood, Herron & Evans
ATTORNEYS

INVENTOR
William B. ter Veen
BY
Wood, Herron & Evans
ATTORNEYS

INVENTOR
William B. ter Veen
BY
Wood, Herron & Evans
ATTORNEYS

INVENTOR
William B. ter Veen
BY
Wood, Herron & Evans
ATTORNEYS

INVENTOR.
William B. ter Veen
BY
Wood, Herron & Evans
ATTORNEYS

INTERCOMMUNICATION AND REMOTE UNIT SELECTION SYSTEM EMPLOYING A MINIMUM OF INTERCONNECTING WIRE

The present invention relates to intercom systems particularly adaptable for use in apartment buildings for communication between one or more central or lobby units and individual remote units located in the different apartment units of the apartment building or complex.

Intercom systems are commonly employed in multiple unit apartment buildings or complexes to communicate between an occupant of any of the various apartment units of the building and visitors in the apartment lobby or entrance way. In secured apartment buildings particularly, such intercom systems are almost essential where the access of visitors to the premises is to be restricted to only those authorized by the occupants of the apartments of the complex.

There are several important features which an intercom system for such a purpose must possess. Certain of these desirable features include selectivity, privacy, security, and remote control.

In the area of selectivity, it is important that a visitor in the apartment lobby or entrance way have the ability to address and signal any one of the units of the apartment building to make the occupant of a given apartment unit aware of the presence of a visitor who wishes to communicate with him.

In the area of privacy, it is important that a visitor in the apartment lobby, or for that matter, any of the occupants of the different apartment units of the building, be prevented from eavesdropping on any given apartment unit or on any conversation between a given apartmnt unit and the lobby, without the knowledge and consent of the occupant of that given apartment unit. Additionally, it is important that occupants of the apartment units be able to exclude incoming conversations which they wish to ignore.

Security of the apartment complex is also important. Security includes, to some extent, privacy as mentioned above, and in addition, the ability of the occupants of the apartment building to control the access of visitors to the building or complex.

Remote control features in apartment intercom units are extremely helpful particularly in providing the features of privacy and security set forth above. In the line of security, it is desirable to provide remote control which can be actuated by the occupants of the apartment units to unlock the door and allow a visitor admission to the apartment building. Additionally, such remote control features are important in achieving the privacy features outlined above; particularly, it is desirable that the occupants of the apartment units have the capability of controlling the audio circuit linking the lobby with the selected apartment unit and to control the direction of converstion between the unit and the lobby.

To provide these features, however, a major disadvantage of the systems of the prior art has been in overcoming the complexity and expense of providing a suitable system for use in apartment houses and complexes wherein the number of apartment units in the complex may number in the tens or hundreds or thousands. The employment of straight forward circuit techniques to the solution of this problem has generally resulted in the systems of the prior art requiring excessive amounts of wire to connect the central unit with the remote units in a manner which can carry all of the audio information and the control information while providing the required selectivity and security as controlled. Furthermore, these attempts have resulted, in some instances, in excessive electronic circuitry at each of the remote units which can amount to a great expense in initial cost in large multiple unit applications, and additionally has resulted in excessive power consumption and the need for extra power supply circuits to operate the remote units.

Accordingly, it is the principle object of the present invention to overcome the disadvantages of the prior art while providing certain desired features in a simple and economical intercom system.

A primary objective of the present invention is to provide an apartment intercom system having a central unit connectable to a plurality of remote units with a minimum amount of wire.

Another objective of the present invention is to provide a simple and economical apartment intercom system capable of performing remote control functions.

Another objective of the present invention is to provide an apartment intercom system utilizing a small number of components at each remote unit.

Another objective of the present invention is to provide an apartment intercom system in which the individual remote units can be selected and called from a central unit while other controls such as talk-up and talk-down selection and door latch release control are controllable from the selected/remote unit, and furthermore, to provide such a system which requires privacy to the occupants of the apartment building.

A general understanding of the features of the present invention can best be obtained from the summaries of each of descriptions of the embodiments of the present invention.

These and other objects and advantages of the invention are set forth, in connection with the embodiments of the invention below, while others will be readily apparent from the following detailed description of the drawings illustrating certain of the embodiments and features according to principles of the present invention. In the Drawings.

Figure 1:
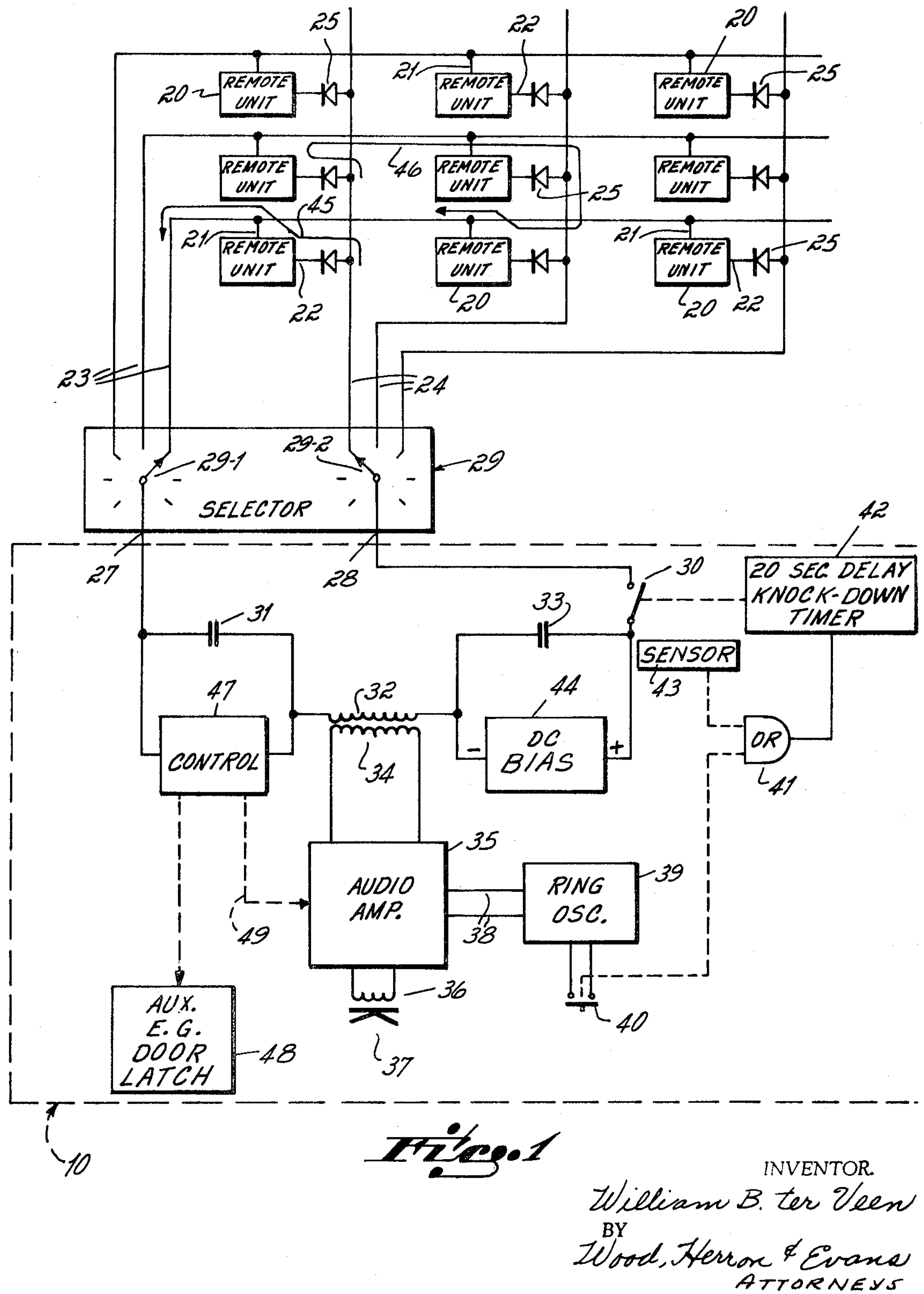
FIG. 1 is a partial schematic partial block diagram of a two wire intercom system according to principles of the present invention.

According to the embodiment of the present invention set forth in FIG. 1, an apartment intercom system is provided having remote units which are connectable through only two leads. Selection of a remote unit is achieved by completing an audio circuit through only a selected remote unit and the central unit. These leads carry talk-up audio signals, talk-down audio signals, and an additionally upward call signalling, downward talk-listen control, and downward door latch release control. Also provided is an automatic disconnect which disconnects the control unit from the remote unit if the call signal is unanswered or if the conversation is completed.

Selection of the individual remote units is provided at the central unit by operation of selector switches which are effective to connect the selected unit in series with the central unit by a closing of a unique circuit through the pair of leads which connect that unit with the central unit. In one specific form, each remote unit is connected at one of its terminals to a conductor of a first set of conductors, and at another of its terminals to a conductor of the second set of conductors. Each unit is connected to a unique combination of conductors from the respective sets. One set of conductors may correspond, for example, to a given floor in an apartment building, while the other wire may correspond to a given vertical riser through all of the floors of the apartment building. Selection of a floor and a riser therefore is effective to connect a unique remote apartment unit to the central unit.

Referring to FIG. 1, this embodiment of the apartment intercom system comprises a central unit 10 located usually at the front door to an apartment building lobby, and a plurality of remote units 20 located at the various apartment units throughout an apartment building. Each of the remote units 20 has two terminals 21 and 22. The remote units 20 connect with the lobby central unit 10 through two sets of wires 23 and 24. The wires of the set 23 are connected to the terminals 21 of the remote units 20, while the wires of set 24 connect to the terminals 22 of the remote units 20. The wires of each set are connected to different groups of remote units in matrix fashion with one remote unit occupying a different crosspoint of the matrix. The different groups of one set may correspond to apartment units located on different floors of the apartment building while the groups of the other set may correspond to a vertical column of apartment units. Connected between each of the terminals 22 and wires 24 is a diode 25. All of the diodes 25 are similarly oriented, for example, with their anodes connected to the wires 24. This diode orientation allows only unidirectional current flow through the remote units and guarantees uniqueness of selection by eliminating alternative sneak paths through several units when one unit is selected.

The central unit 10 is provided with two terminals 27 and 28. A selector switch 29, also located in the lobby, connects the terminals 27 and 28 of the central unit 10 to one of the wires of each of the sets 23 and 24 respectively. With a positive bias on the terminal 28, only one remote unit is rendered conductive. By this means of selection, the selected remote unit 20 is connected in series with audio circuit of the central unit 10. This audio circuit comprises a switch 30, a capacitor 31, a transformer winding 32, and a capacitor 33. An audio signal is coupled between the transformer winding 32 and a transformer winding 34 of an audio amplifier 35 which has a winding 36 which is in turn coupled to a lobby two way speaker unit 37. The amplifier 35 is effective to amplify audio signals in both the talk-up and talk-down directions. The audio amplifier 35 is also effective to apply a ring or call signal at its output terminals 27 and 28. The call signal is received through the leads 38 which connect the amplifier 35 to the ring oscillator 39. The ring oscillator 39 is actuated by depression of the ring push button 40 which keys the oscillator 39 to apply a ring signal to the remote unit 20 connected through the selector switch 29.

Depression of the switch 40 sends a signal through an OR-gate 41 to actuate a timer 42, which closes the switch 30. If a signal, indicating that the called apartment has responded to the call, does not appear at a sensor 43, during the interval of the timer 42, the switch 30 opens. If a signal does appear, it passes through the OR-gate 41 to reset the sensor 43. The sensor 43 may be an audio detector responsive to voice signals, or may respond to a talk-down control signal which controls the amplifier 35 as discussed below.

To insure that only a single remote unit 20 is connected by operation of the selector switch 29, a DC bias voltage 44 is connected across a capacitor 33 to develop a DC bias potential across the leads 27 and 28, which thereby adds a DC level to the audio signal. This DC bias voltage 44 biases only the diode 25 at the crosspoint of the matrix into conduction. The desired current path when the selector switch 29 is positioned as shown in FIG. 1 is illustrated by the arrow 45 in the figure. A potential sneak path which is eliminated by the bias-diode combination is illustrated by the arrow 46 in FIG. 1. The DC bias voltage 44 has an AC impedance which is high relative to that of capacitor 33, and preferably includes a series choke.

While selection of the desired apartment and ringing of the selected apartment are provided at the lobby or central unit location, the control functions such as releasing a door latch or controlling the talk-up or talk-down direction of the amplifier 35 are controlled from the remote units 20. These control functions are provided by transmission of signals of a kind distinguishable from the audio signals via the same two leads connecting the remote and central units.

A DC circuit is provided between the terminals 27 and 28 of the central circuit 10 which extends from the lead 27, through the control circuit 47, through the winding 32, through the DC bias voltage source 44, through the switch 30, and to the terminal 28. By modulating this DC current at the remote unit by a signal other than an audio frequency signal, a distinguishable control signal is communicated from the remote unit to the central unit. By then de-modulating this signal at the control 47, the control signal can be utilized to actuate control functions. The typical functions as mentioned above are the controlling of a door latch 48 or the controlling of the amplifier direction through the control path 49. More specific controls suitable for this purpose are described in connection with FIGS. 2 and 3.

Figure 2:
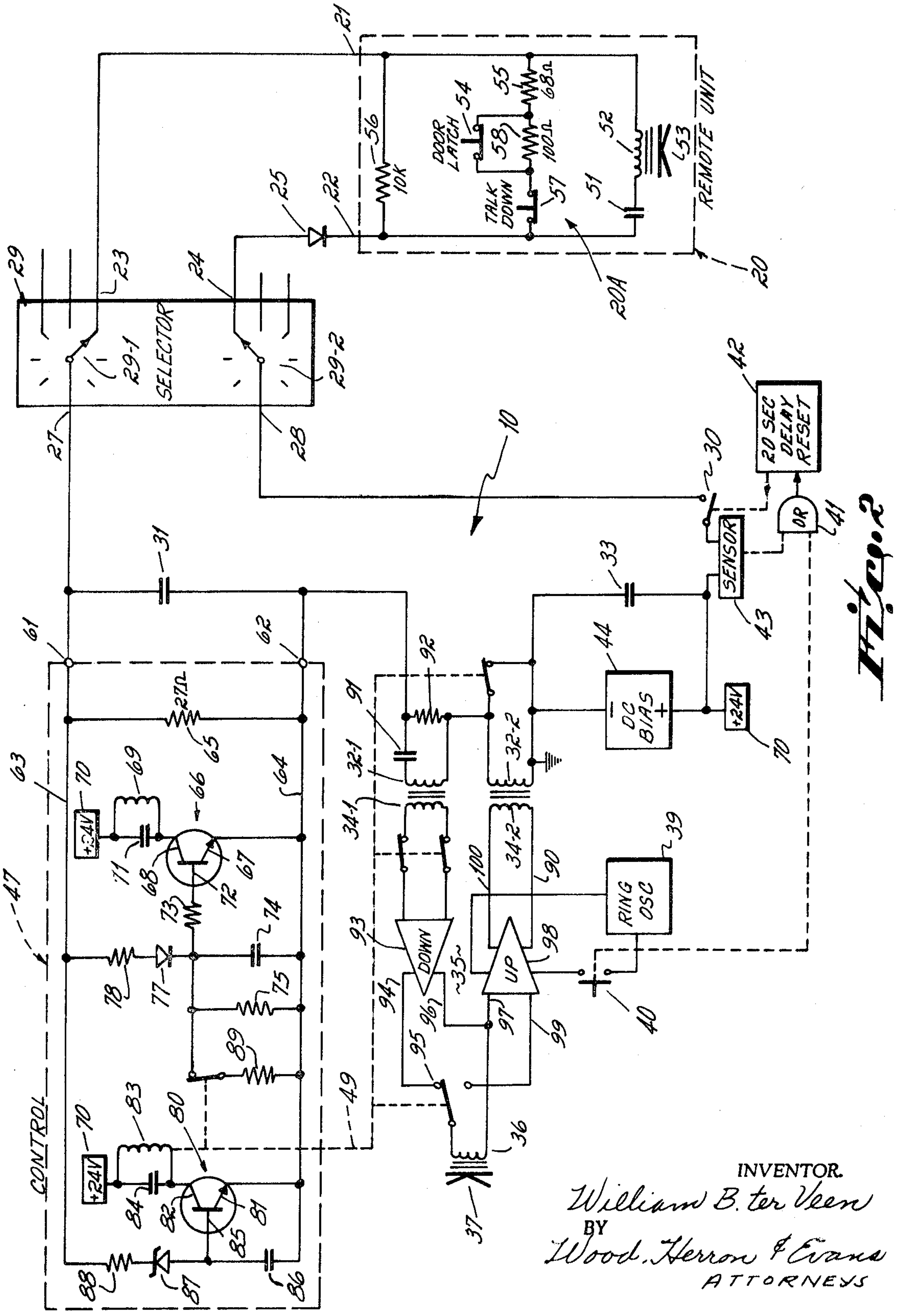
FIG. 2 is a schematic diagram of the electrical circuit which includes the central lobby unit and the selected remote apartment unit according to one embodiment of the two wire system of FIG. 1.

A more specific form of the embodiment of FIG. 1 is set forth in FIG. 2. This form provides a DC control system superimposed on the audio lines. A selective resistance DC signaling circuit in each remote unit is effective to vary a DC level at the central unit which is detected by a DC level sensor. The sensor actuates a door latch release relay and controls talk-up and talk-down modes by alternatively connecting into the central unit audio circuit, one of two oppositely directed amplifiers in response to the control signals from the remote unit. The control signals are applied at the remote unit by selectively connecting different impedances in parallel across the audio circuit. The remote units use no active circuit elements and require no additional power supply. A two way speaker is provided at each central and remote unit.

Referring to FIG. 2, connected across the leads 21 and 22 of the remote unit 20 is the audio circuit 20A, comprising a capacitor 51 connected in series with the winding 52 of the remote speaker 53. The control signaling circuit includes three DC resistive paths connected between the leads 21 and 22 and across the audio circuit.

This circuit includes a 10K resistor 56, connected across the terminals 21 and 22 to provide a relatively high DC impedance, and low impedance circuit also connected across the terminals 21 and 22 in parallel with the resistor 56. This low impedance circuit includes a 100 ohm resistor 58 and a 68 ohm resistor 55 connected in series with a normally closed pushbutton switch 57. Connected across the 100 ohm resistor 58 is another normally closed push button switch 54. The switch 54 provides a door latch release signal, while the switch 57 signals the talk-down mode. Normally, when the remote unit 20 is in talk-up or standby modes, with both switches 57 and 54 closed as shown, the DC impedance of the remote unit across its terminals 21 and 22 is 68 ohms, the resistor 56 having little effect and the resistor 58 being effectively shorted out by the switch 54. In a talk-down mode, with the switch 57 opened, the DC impedance is 10K ohms, the only DC path being through the resistor 56. When the door release switch 54 is opened, the impedance is 168 ohms, as the DC path will then include the resistors 55 and 58.

At the central unit 10, the control circuit 47 senses the voltage level change caused by the impedance changes at the remote unit 20 to execute control functions accordingly. The control circuit 47 includes a pair of terminals 61 and 62 connected across the external capacitor 31. A positive bus line 63 is connected to the terminal 61 and the negative bus line 64 is connected to the terminal 62. Across the lines 63 and 64 is connected a 27 ohm resistor 65. Substantially all of the DC current flowing through the remote unit flows through this resistor, and the DC voltage source 44. The magnitude of this current is proportioned to the impedance in the entire circuit and therefore is responsive to the DC impedance of the remote unit. Since the voltage developed across the resistor 65 is proportioned to the current through the resistor a control voltage is developed across resistor 65 which can be varied by the change of impedances at the remote unit 20 caused by the actuation of the momentary switches 57 and 54.

The sensing of the different voltage levels across this resistor is utilized to execute the various control functions. A transistor 66 is provided having its emitter 67 connected to the negative bus line 64, and its collector 68 connected through a winding 69 of the door latch relay to the positive voltage source 70. Connected in parallel across the winding 69 is a capacitor 71. The base 72 of the transistor 66 is connected through a resistor 73 and a capacitor 74 to the negative bus line 64. A high value resistor 75 is connected across the capacitor 74. A diode 77 is provided having its cathode connected to the juncture of the resistor 73 and capacitor 74, and its anode connected through a resistor 78 to the positive bus line 63. A transistor 80 is provided having its emitter 81 connected to the negative bus line 64 and its collector 82 connected through the winding 83 of a talk-up relay and to the positive voltage source 70. Connected across the winding 83 is a capacitor 84. The base 85 of the transistor 80 is connected through a capacitor 86 to the negative voltage line 64. A zener diode 87 is provided having its anode connected to the base 85 of the transistor 80 and its cathode connected through a resistor 88 to the positive bus line 63. The talk-up relay winding 83 controls a set of normally closed contacts 83–1 connected in series with a low value resistor 89 across the resistor 75. This provides a means to lock out the door latch circuit when the system is in talk-down mode.

The audio circuit of the central unit 10 includes the winding 32 which, in this embodiment, includes a pair of windings 32–1 and 32–2. The winding 32–1 is connected in series with a capacitor 91 across a resistor 92. The resistor 92 and the windings 32–1 are connected in series with the winding 32–2. A set of normally closed contacts 83–2 of the talk-up relay 83 are connected across the winding 32–2. The winding 34 is comprised of two sets of windings 34–1 and 34–2. Each of the leads of the winding 34–1 is connected through a respective set of contacts 83–3 and 83–4 respectively of the talk-up relay 83, both of which are normally closed, and to the inputs of the talk-down amplifier 93. The amplifier 93 has an output 94 connected to the normally closed contact 95 of a set of relay contacts 83–5 of the talk-up relay 83. The common one of the contacts 83–5 is connected through a winding 36 of the lobby speaker and microphone 37, to the other output 96, the amplifier 93, and to an input 97 of the talk-up amplifier 98. The talk-up amplifier 98 has another input 99 connected to the normally opened contact of the relay set of contacts 83–5. Amplifier 98 has a pair of output terminals 100 and 90 which are connected across the winding 34–2.

In operation, the system is initially as illustrated in FIG. 2, with the switch 30 in an opened condition. With the switch 30 opened, no current is flowing through the resistor 65 of the control circuit 47, and therefore, neither of the control relay windings 69 or 83 is energized. Thus, the contacts 83–1 through 83–5 are all in the conditions illustrated in FIG. 2.

When a caller wishes to ring an apartment, he sets the two switches 29–1 and 29–2 of the selector 29 to the indication of the desired apartment to be contacted. Because the switch 30 is opened, the operation of the selector switch 29 has no effect on anything, and of particular importance, no noise is generated in the speakers 53 of the various remote units to which the selector 29 momentarily connects. When the proper unit has been selected, the visitor depresses the ring switch 40 which connects the ring oscillator 39 to the talk-up amplifier 98 and simultaneously energizes the time delay circuit 42, causing the switch 30 to close. Because the connected remote unit 20 is in a low DC impedance state, an immediate voltage appears across the resistor 65 of the control 47, causing the zener diode 87 to break over which causes the relay 83 to energize, closing the contacts 83–1 through 83–4 and switching the contact 83–5 to assume a state opposite what is shown in FIG. 2. This connects the talk-up amplifier 98 into the audio circuit and transmits the ring oscillator amplified output to the remote unit speaker 53 to audibly signal an apartment occupant. If the occupant does not respond within the knock-down time of the timer 42, which might be conveniently twenty seconds, the switch 30 will drop out and the system will be reset to its initial condition. If any conversation appears on the circuit, the time delay 42 will automatically be reset, and will only cause the switch 30 to drop out when the 20 seconds have elapsed since the last conversation on the line.

When the apartment occupant wishes to answer or talk-down to the central unit, the apartment occupant depresses the talk-down switch 57, which causes a high impedance of the resistor 56 to appear across the remote unit terminals 21 and 22. This causes a negligible current to flow through the resistor 65 of the sensor 47. This negligible current produces a very small voltage drop across the resistor 65 which is insufficient to break over the zener diode 87 and therefore turns off transistor 80, causing the relay 83 to de-energize. The de-energizing of the relay causes contacts 83–1 through 83–5 again to assume their conditions shown in FIG. 2. This connects the talk-down amplifier 93 into the circuit and disconnects the talk-up amplifier 98. The occupant then can talk into the remote speaker 53 and his voice is reproduced on the lobby speaker 37.

Talk-up and talk-down functions are entirely within the control of the apartment occupant. Therefore, a person in the lobby cannot eavesdrop upon any of the apartments.

If the apartment occupant desires the visitor to be admitted to the lobby he may depress the door latch switch 54. This causes an intermediate impedance of 168 ohms to appear across the remote terminals 21 and 22, which causes a moderate current and therefore moderate voltage drop to appear across the resistor 65. This voltage is sufficient to break over the forward voltage drop of the diode 77 but is insufficient to break over the reverse voltage of the zener diode 87. Therefore, the door latch relay 69 is energized to open the door to the lobby. To prevent the door latch relay 69 from operating when the talk-down switch 57 is depressed, the set of contacts 83–1 are provided to essentially ground the base 72 of the transistor 66 to prevent it from operating when the talk-up relay 83 is operated. This renders the door latch relay operative only in response to intermediate voltages which are greater than the forward voltage drop of the diode 77 but less than the reverse voltage of the zener diode 87.

Figure 3:
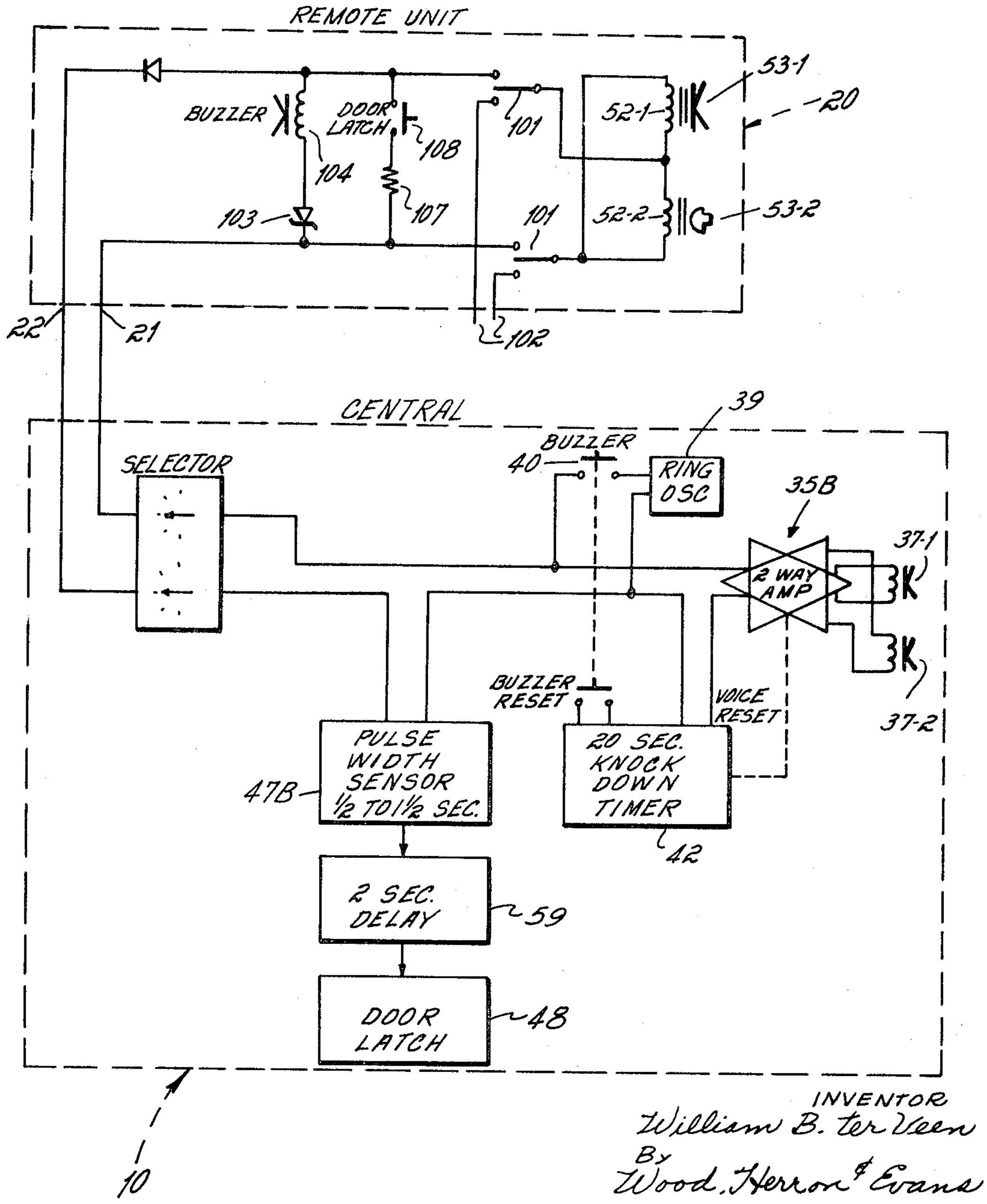
FIG. 3 is an alternative two wire system according to FIG. 1 illustrating particularly alternative remote controls.

The embodiment shown in FIG. 3 illustrates certain variations of that of FIG. 2. Specifically, it employs a two-way amplifier instead of the reversible amplifier arrangement. This provides a two-way conversation capability instead of selective one-way conversations, and therefore does not require the talk/listen control function. This simultaneous two-way system does not provide the privacy of the one-way system, and this is manifested in the inability of the apartment occupant to listen to the lobby without having sounds in his apartment overheard.

The control circuit of this embodiment utilizes a pulse-width sensor rather than the voltage level sensor of the previous embodiment. This has an advantage of being insensitive to voltage fluctuations on the line. Only two discrete signal levels are required and coding is provided on a time basis. Different functions can be provided by using different pulse-widths for each or different numbers of pulses.

Referring to FIG. 3, the amplifier 35B is a two directional amplifier such as are commonly employed in telephone applications. The amplifier has connected to it a lobby speaker 37–1 and lobby microphone 37–2. The timing circuit 42 is shown connected in a manner slightly different than that in the previous embodiment in that instead of controlling a switch 30 in the audio circuit, the amplifier voltage line is controlled to energize and de-energize the amplifier. The control circuit 47B is a pulse width sensor, which is illustrated as controlling the door latch 48 through a two second time delay 59.

The remote unit 20 is shown as including a remote speaker microphone assembly 53 having a speaker 53–1 and a microphone 53–2 arranged in a manner similar to a conventional telephone receiver. Because the talk-up/talk-down switch is not employed in this embodiment, a pair of switchs 101 are provided to disconnect the unit 53 from the lines to insure privacy and prevent eavesdropping from the lobby. If the unit 53 is the conventional telephone, the switches 101 can be used to alternatively connect it across outside telephone lines 102. Because the microphone assembly 53 is disconnectable, a separate buzzer circuit is employed and permanently connected across the lines 21 and 22. This comprises a zener diode 103 connected in series with a buzzer winding 104. The zener diode prevents the buzzer from responding to normal voice conversations but allows it to respond to a higher amplitude signal from the oscillator 39.

A door latch control circuit is provided at the remote unit 20 which comprises a resistor 107 connected in series with a push button switch 108. The switch 108 provides a means for varying the impedance level across the terminals 21 and 22 between a high impedance and low impedance state. Because pulse width sensing is used in this embodiment, only one switch is required regardless of the number of control functions to be executed, each control function being distinguishable purely by the length of time which the button 108 is depressed, to generate either one pulse or a sequence of pulses. In the present embodiment only one function, that of door latch control is employed, and this is executed by a one second depression of the button 108. Talk-listen control could also be added by adapting the control 47B to respond to a different type of pulse or sequence of pulses.

Figure 4:
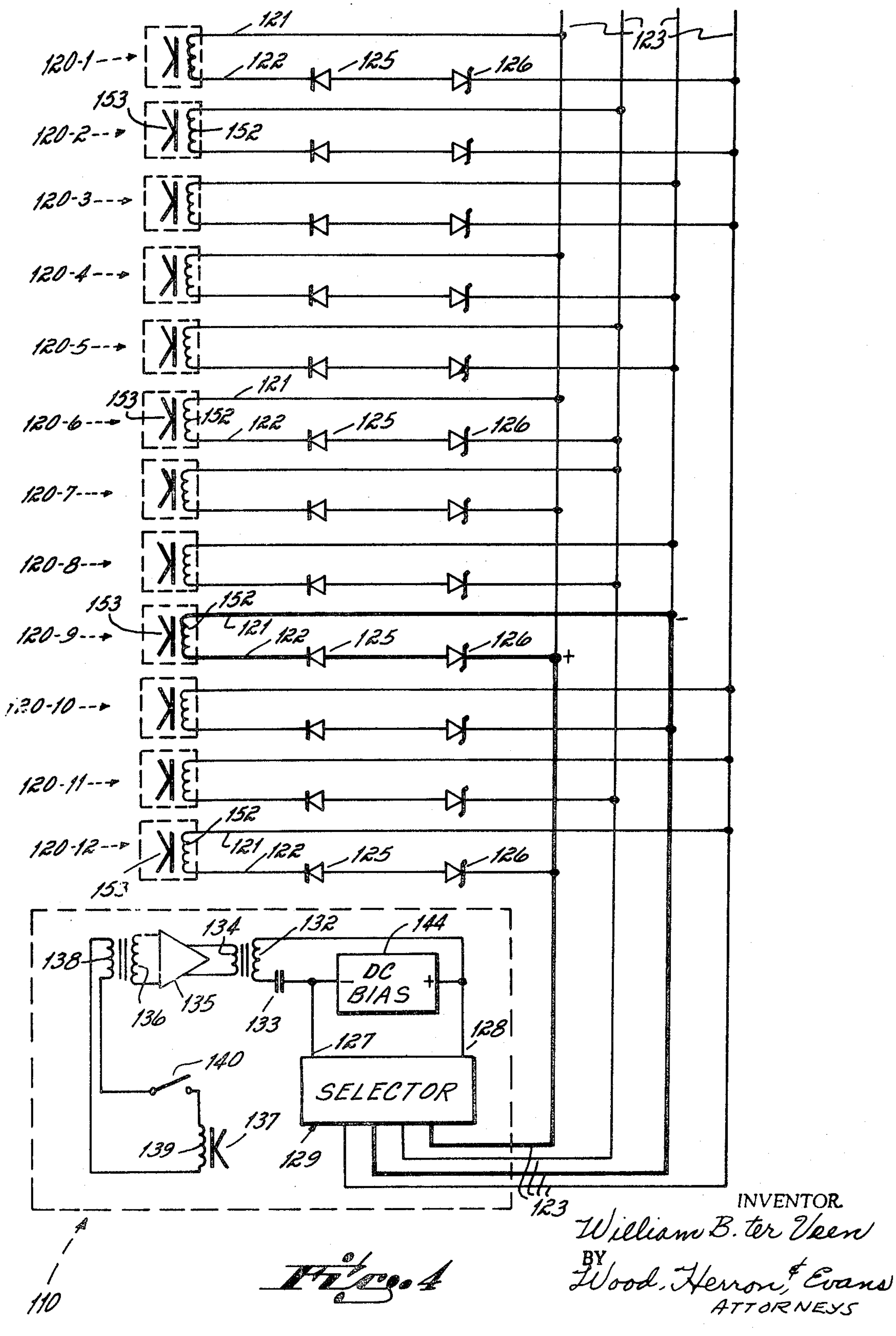
FIG. 4 is a partial schematic, partial block diagram illustrating a zener diode permutation selection circuit in connection with a two wire system embodying principles as set forth in FIG. 1.

In the embodiment of FIG. 4, the two wire features of the embodiments of FIGS. 1 through 3 are provided in combination with a permutation coded selection system. In this system, each of the remote units is connected in a unique combination and direction across pairs of wires of a single set. Selection is provided by energizing one wire of the set with a positive potential while energizing another wire of the set with a negative potential. In such a manner only one unit will be energized. Sneak paths are eliminated by the incorporation of a backward bias zener diode in series with each of the remote units. By selecting the breakdown voltage of these zener diodes at less than the bias voltage applied across the selected pair of wires of the set, but greater than one-half of this bias voltage, the possibility of sneak paths is eliminated because the voltage is insufficient to cause a current to conduct to more than one remote unit in series. With audio signals impressed on the lines, the range of zener voltages is preferably: less than the bias voltage minus the negative peak audio signal amplitude, but greater than one-half of the sum of the bias voltage plus the positive peak audio signal amplitude, times the bias voltage, or ideally two-thirds of the bias voltage for maximum audio signal amplitude. The forward voltage drop of the diodes 125 has the effect of adding to the zener voltage.

The basic advantage of these incroporation zener diodes is that, by enabling the use of permutation coding without sneak paths present, the number of wires required to select a given number of units is greatly reduced below that of conventional systems. For example, permutation coding in which a voltage of a given polarity is imposed across two wires of a set of four wires results in the ability to uniquely select a remote unit from as many as 12 remote units. Five wires allows selectivity of up to 20 remote units; six wires, thirty remote units; seven wires, 42 remote units; and ten wires, ninety remote units. This compares with the matrix selection system of FIGS. 1 through 3 which can accommodate four, six, nine, 12 and 25 units for four, five, six, seven and 10 wires respectively; that is, to accommodate the same number of units, the number of wires required is seven, nine, 11, 13 and 19 respectively.

Referring now to FIG. 4, a two wire intercom system employing the zener diode concept is illustrated in a simplified schematic and block diagram form. While this embodiment, as shown, can operate as a one-way communication system, other features of previous embodiments can be incorporated, but have been omitted from this figure to better facilitate understanding of the concepts presented in this embodiment.

Twelve remote units 120–1 through 120–12 are provided each unit as a pair of terminals 121 and 122. The terminals 121 and 122 of each of the remote units 120 connect across a pair of wires selected from the set of wires 123. Connected in series with each of the remote units 120, between the terminal 122 and its connection with the wire of the set 123, is a diode 125 and a backward biased zener diode 126.

The central unit 110 includes a pair of terminals 127 and 128. Each of the terminals 127 and 128 can selectively be connected to any one of the wires of the set 123, provided that the terminals 127 and 128 will not be connected simultaneously to the same wire. The selectivity is provided by the selector 129 connected between the terminals, 127 and 128, of the central unit 110 and the wires of the set 123. A DC bias 144 is connected across the terminals 127 and 128 of the remote unit. Also connected across terminals 127 and 128 is an audio circuit which includes a transformer winding 132 and a capacitor 133. Coupled to the audio circuit at the winding 132 is another transformer winding 134 which comprises the primary winding of the output transformer of the audio amplifier 135. The audio amplifier has an input secondary winding 136 coupled to a transformer primary winding 138 which is connected in series with the winding 139 of the lobby speaker/microphone 137 through a switch 140.

The DC bias 144 is approximately two-thirds of the break-over voltage of the zener diodes 126 at the remote units for maximum audio signal amplitudes.

In operation, the remote unit is selected by setting the selector switch 129 to a combination and permutation assigned to the desired one of the remote units 120. This applies the DC bias across that remote unit, and, because of the diode arrangement, only that selected unit becomes conductive. In FIG. 4, the selected unit is unit 120–9, the biasing current path illustrated by the heavy lines on the wire set 123 of the figure. This biasing voltage is sufficiently over the break-over voltage of the zener diode 126, preferably, to sufficiently allow full conduction of an audio AC signal on the lines. The AC signal is applied by closure of the switch 140 and generation of a signal at the microphone 137 which is amplified by the amplifier 135 and coupled into the winding 132 of the AC circuit and applied through the selector 129 and the lines 123 to the winding 152 of the remote unit speaker 153 of the selected remote unit 120–9.

The function of the zener diodes in the elimination of sneak paths is best illustrated by reference to FIGS. *5a* and *5b* which compare a permutation coded selector circuit which employs the zener diodes with one which does not.

Referring to FIGS. *5a* and *5b*, a basic permutation coded system is generally described. A plurality of loads, for example, 12 in number, designated 201–1 through 201–12 are provided, one located in a different one of twelve apartment units. These loads 201 may be, for example, apartment speaker microphone units or relays which are operable to connect a speaker microphone unit to a common audio line. Each of the loads 201 is connected through a pair of leads 202 and 203 across a pair of lines selected from a set of four lines 205–1 through 205–4. When a control voltage appears across the two selected leads, current is permitted to pass through a load 201 to energize the load. Connected in the line 203 is a diode 207. The diode permits the load 201 to respond to a voltage of only one polarity across the lines 205. As illustrated in FIG. *5a*, the wires of the set 205 are four in number, providing a total of six possible combinations of two wires. A voltage source, 208 has a positive lead 209 and a negative lead 210, each lead being selectively connectable through a selection unit 211 to different wires of the set of wires 205. The six combinations have two permutations each, one for each polarity. The selection arrangement provides a total of twelve unique combinations and permutations of voltages across pairs of the set of wires 205. These conditions are illustrated in the table 212, which represents the conditions present on each of the wires in the various selection states. A plus symbol indicates a positive voltage; a minus symbol, a negative voltage; and a zero symbol, unused or open-circuited line. When a unit is to be selected, for example unit 201–11, it is necessary to apply a positive voltage to line 205–2 and a negative voltage to line 205–4 as illustrated in row 11 of the table 212. The current path which is desired by such a connection is illustrated by the arrow 214. However, in the particular arrangement shown, a number of alternative sneak paths are also possible such as the one illustrated by the arrow 215. The path 215 will be completed by the connection illustrated in row 11 of the table 212 through a series circuit through unit 201–8 from line 205–2 to 205–3 and through unit 201–10 from line 205–3 to 205–4.

Figures 5A, 5B:
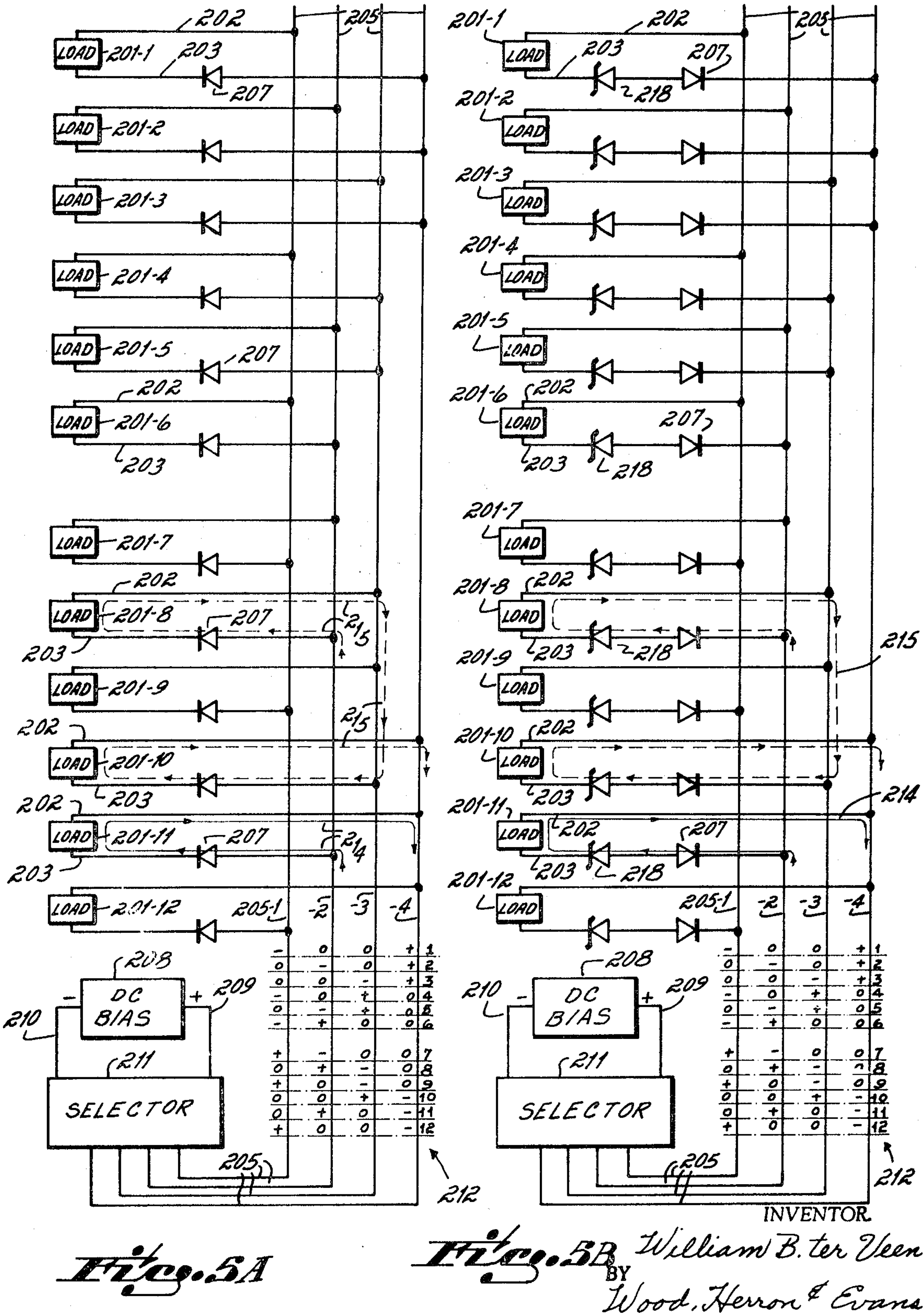
FIGS. 5a and 5b are simplified block and schematic diagrams of the selection circuit of FIG. 4, illustrating particularly the function of the zener diodes in eliminating sneak paths.

A circuit for eliminating the sneak paths is illustrated by the diagram of FIG. 5*b*. This diagram corresponds to that of FIG. 5*a* with the addition of a reversed connected zener diode 218 connected in the line 203 of each remote unit 201. By the use of a zener diode in this arrangement, and by selection of voltage of the voltage source 208 such that the voltage applied across the selected leads of the set 205 is equal to approximately one and one-half times and break-over voltage of the zener diode 218, it will be impossible to complete any sneak paths of the type discussed in connection with FIG. 5a represented by the arrow 215. For example, in selecting unit 11, a positive voltage will appear on line 205–2 and a negative voltage will appear on line 205–4. This voltage, being greater than the break-over voltage of the zener diode 218–11, will cause a current to flow through the load 201–11 and thereby to energize the load. This current path is represented by the arrow 214 as in FIG. 5*a*. However, with regard to the sneak path represented by arrow 215, the voltage which appears across a series circuit which includes both the zener diodes of units 8 and 10 will be less than the sum of the break-over voltages of the two zener diodes 218–8 and 218–10. Therefore, no current will flow through these units due to the presence of the two series zener diodes having a total break-over voltage of more than the bias voltage on the lines; therefore, sneak paths are prevented. The use of the zener diodes in the arrangement indicated therefore prevents the currents of any sneak paths and therefore provides twelve unique current paths for the selection of twelve units with the four wire control circuit shown. While zener diodes per se are disclosed and employed in these embodiments of the invention, it is understood that devices having a similar reverse voltage characteristic are clearly equivalent. The term zener diode will, however, be used here to include such characteristic devices.

Figure 6:
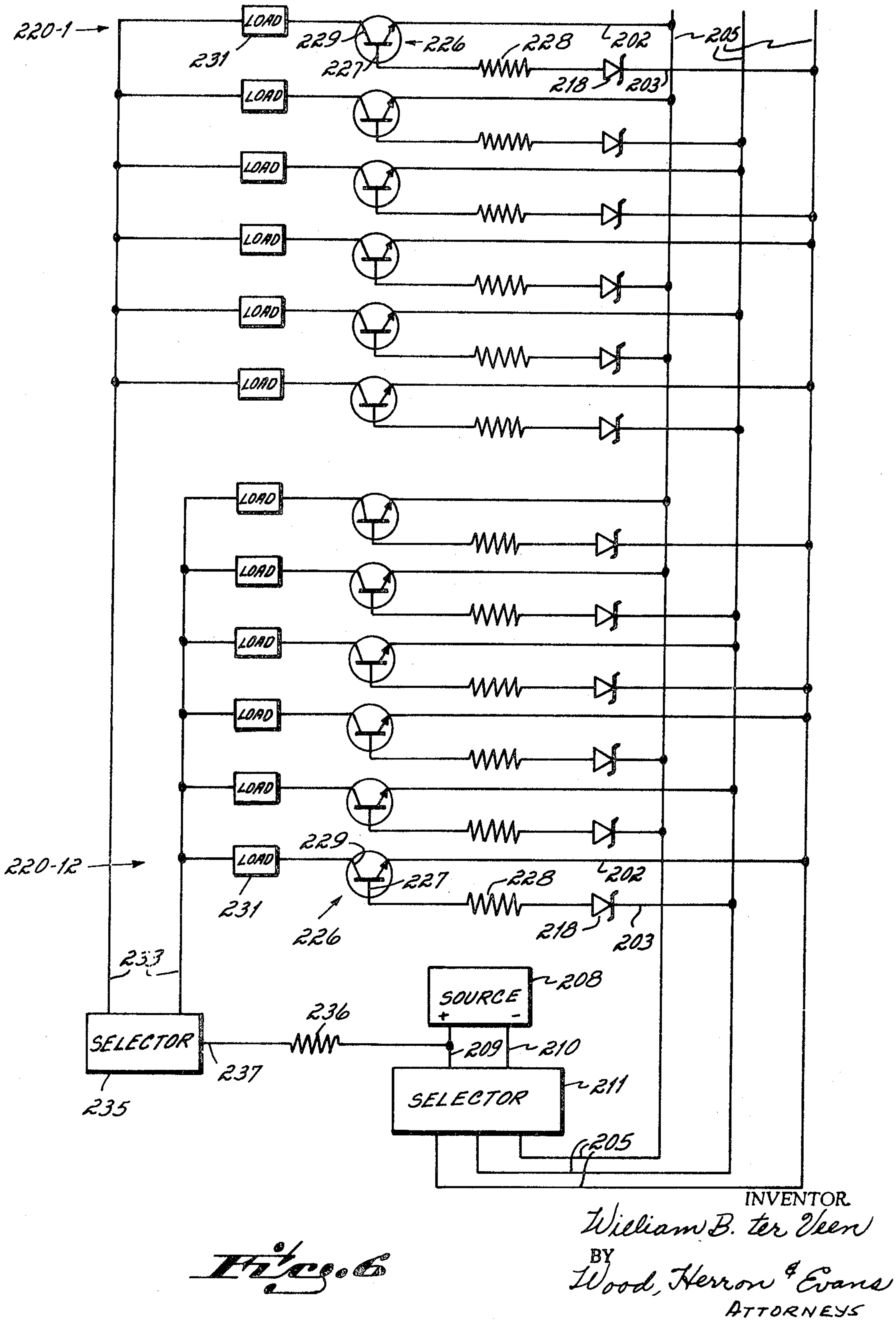
FIG. 6 is an embodiment of the zener diode principle of FIG. 5 in combination with transistor switches.

Another embodiment illustrating the use of the zener diodes in preventing sneak paths in permutation coded intercom systems is illustrated in FIG. 6.

In this embodiment, each of the remote units includes an NPN transister switch 226. The base 227 of the transistor 226 is connected through a resistor 228 to the anode of the zener diode 218. The cathode of the zener diode 218 is connected to the lead 203 of the remote unit 220. The lead 202 of the remote unit 220 is connected to the emitter of the transister 226. Comparing this remote unit circuit thus far to the remote unit of FIG. 5*b*, the load 231 has a circuit analogy in the resistor 228 and the base to emitter path of the transister 226. The diode 218 is provided by the base to emitter path of the transistor 226. A load 231 is connected in each of the remote units 220 between the collector 229 of the transistor 226 and a wire of the set 233. This load 231 may also be the remote unit speaker/microphone or another switch operable to connect a speaker/microphone to an audio circuit.

The central unit includes a voltage source 208 having a positive lead 209 and a negative lead 210 connected through the selector 211 to the set of wires 205 which, in this embodiment, is illustrated as a three-wire set. A selector 235 is provided having a common terminal which is connected through a resistor 236 to the positive voltage line 209. The selector 235 is effective to selectively connect the common terminal 237 to either one of the lines of the set 233, which, in this embodiment, is illustrated as a two-wire set. The three-wire set 205 and the two-wire set 233 will operate the equivalent number of units, twelve, as are operated by the system illustrated in FIG. 5*b*.

The zener diodes of this embodiment operate in the same manner as those of the embodiment of FIG. 5*b*. The three-wire set 205 provides ability to select up to six units. The wires of the set 233 allow selection of different groups of six units. While this requires more wires than the embodiment of FIG. 5*b*, it provides a means adaptable to certain logical arrangements of apartment buildings which may have particular advantage in certain applications, as, for example, in the embodiment of FIG. 7. A most desirable logical arrangement, from the point of view of ease of use by lobby visitors, is a decode switching arrangement by which the visitor can select a remote unit by the decimal digits of the room number.

Figure 7:
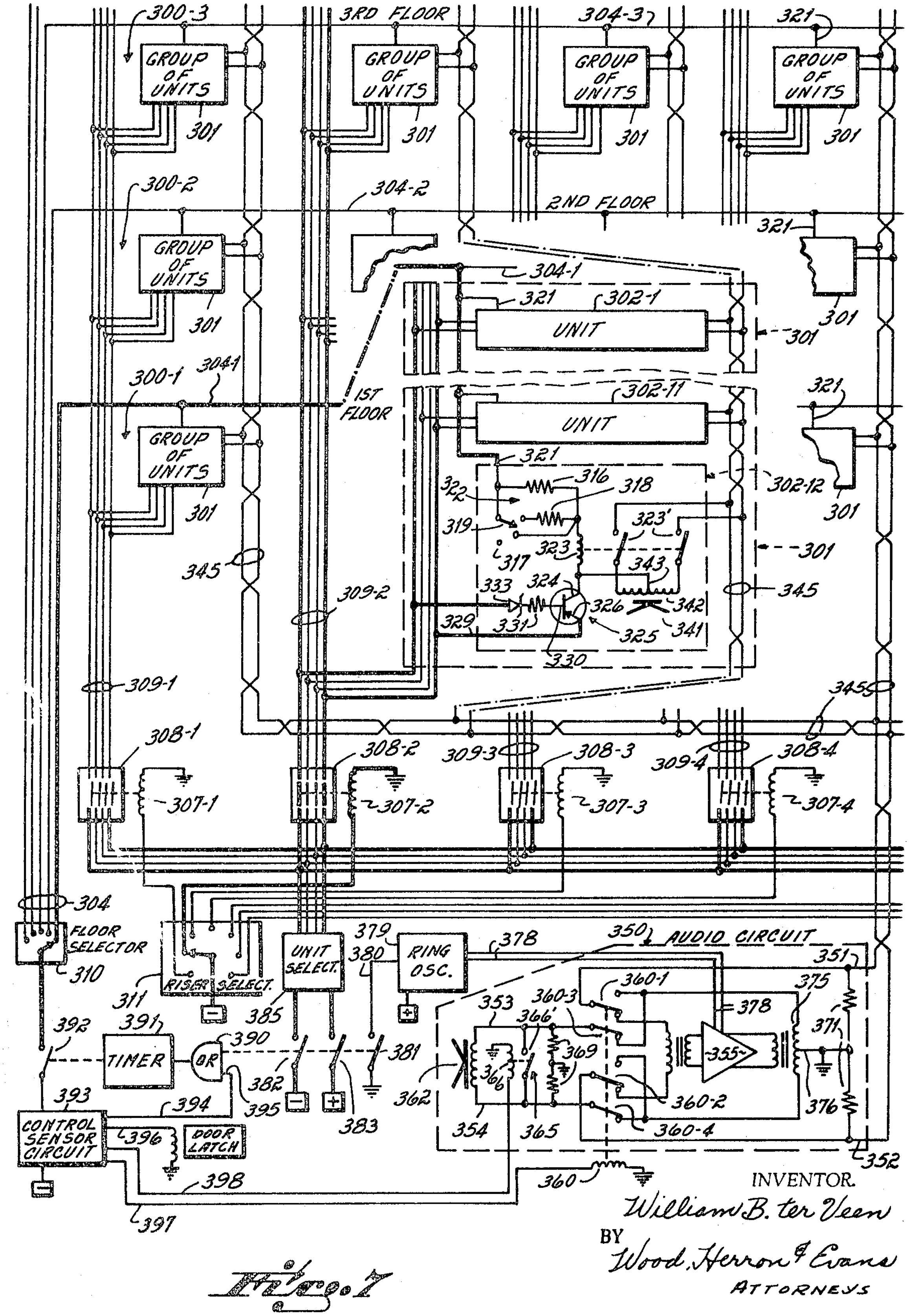
FIG. 7 is an apartment intercom system embodying the zener diode selection circuit of FIG. 6 in combination with additional selection features applied to a common audio system in accordance with certain features of the present invention.

The embodiment set forth in FIG. 7 incorporates the zener diode and transistor switch selection system of FIG. 6 in an intercom system for a large apartment building or complex. This embodiment includes most of the features of the above embodiments, including the timed shut-down and remote door latch and amplifier direction control. In addition, this embodiment provides a lobby speaker lock-out which enables the lobby speaker only when a positive answer to a call signal is received at the central unit. Also, a remote speaker hold-in circuit connects only the selected remote speaker to the common audio lines. These added features provide absolute privacy.

The selection logic of the present embodiment is especially useful in apartment complexes in which the apartment units are logically arranged in well defined groups. For example, a large apartment building will probably have a large number of floors in which apartment units are arranged in identical or similar floor plans. Each floor might have approximately the same number of apartment units which might be arranged in groups, the units of each group, for instance, being located in different wings of the apartment building. Or, for example, an apartment complex may consist of separate apartment buildings each served by a common visitor lobby or gate entrance. This embodiment provides a simple system for selecting the unit which a visitor wishes to call.

More specifically, a floor selector 310 is provided to select the floor 300 on which the desired apartment is located by activating any one of the wires of the set of wires 304. A vertical selector or "riser" selector 311 is provided to select the group 301 of apartment units 302 on each floor which are in the vicinity of the vertical riser. This riser selector 311 operates by actuating a switch which connects any one of the identical bundles of wires 309 which rise vertically through each floor of the apartment building in the vicinity of the selected group of apartments.

Each of the groups of wires 309 is connected through different switch boxes 308, each energized by a different relay 307 connected to a different contact of the riser selector switch 311 which applies DC power to energize the selected relay 307. Each of these bundles is identical and comprises, for example, four wires which are connected to the different apartment units of the selected group on each of the selected floors in a manner similar to that illustrated in FIG. 6. Each of the units on a given floor within the given group is connected in a unique manner across pairs or wires of the bundle, thus providing means to select a unique apartment from a selected group of apartments on a selected floor of the apartment building.

Each of the individual remote units 302 includes a floor select terminal 321 which connects externally to the floor line 304, and which connects internally through a selective resistance 322 to one terminal of a relay winding 323. The other terminal of the relay winding connects to the collector 324 of a PNP transistor 325. The emitter 326 of the transistor 325 connects to a terminal 329 of the unit 302 which connects externally to one of the lines of the bundle 309. The base 330 of the transistor 325 connects through the resistor 331 to the cathode of a zener diode 333, the anode of which is connected to another wire of the bundle 309. The selector 322 is provided with three alternative resistance paths which connect different DC impedances in a DC path through the unit 302, which impedance causes a voltage change which can be sensed by a control circuit at the control unit to execute control reactions, such as is done in the embodiment of FIG. 2. The selector 322 includes a switch 319 which is connectable to a resistor 318 of 1,000 ohms, for example, or a direct zero ohm path 317, or an open circuit, which leaves an effective resistance of resistor 316 of, for example, 2,000 ohms in series with the winding 323.

The apartment unit two-way speaker 341 has a winding 342 provided with a center tap 343 connected to the collector 324 of the transistor 325. The end terminals of the winding 342 are connected through relay contacts 323' of the relay winding 323 across the leads of the common audio line 345. The common audio line 345 connects to every unit of the apartment building. The common audio leads 345 connect each of the units across two terminals of the audio circuit 350 located at the central lobby unit. The audio circuit 350 is provided with the terminals 351 and 352 and with terminals 353 and 354. These sets of terminals alternatively connect across either the input or the output windings of an audio amplifier 355. The alternative connectability is provided by a talk/listen relay 360 having contact sets 360–1 through 360–4, each having its wiper terminals connected to the terminals 351 through 354, respectively. The terminals 353 and 354 are connected across the lobby speaker unit 362.

Also connected across the speaker microphone is a shunting switch 365 which includes the contacts 366' of a relay 366. A balanced pair of resistors 369 is also connected across the terminals 353 and 354, the junction of the two resistors 369 being connected to ground. Similarly, the terminals 351 and 352 have connected across them a balanced pair of series resistors 371, the junction of which is also connected to ground. Also, the output coil 375 of the amplifier 355 is provided with a grounded center tap 376. The amplifier 355 also has an input 378 to which is connected a ring oscillator 379 which is in turn connected through a key line 380 and a ring switch contact 381 to ground. The ring switch contact 381 is ganged to a pair of switch contact sets 382 and 383 which connect respectively the negative and positive power sources to a unit selection switch 385 in much the same manner as indicated in connection with FIG. 6.

Also ganged to this push button ring switch is an input of OR-gate 390 which has its output connected to a reset input of a knock-down timer 391. The output of the timer 391 remains closed for a predetermined time of, say, approximately 20 seconds after the reset signal is applied. This closes a switch 392 connected in series between the common terminal of the floor selector switch 310 and the control sensor circuit 393 which is in turn connected to a negative voltage supply.

The control circuit 393 includes means such as those illustrated in FIG. 1 for sensing either a voice signal or a talk-down command. These means are connected through the control output 394 to an input 395 of the OR-gate 390 to reset the timer whenever the conversation is present on the audio lines 345. In this manner, the switch 392 will be opened if no answer to the ring signal is made within twenty seconds of the ring signal. Similarly, the control circuit 393 has a door latch output 396, a talk/listen output 397, and a lobby speaker shunt output 398. The shunt output 398 is effective to lock out the lobby speaker until there is an answer to the call signal from the unit. This answer can be detected by latching the relay in response to the first talk-down signal from the voltage unit.

In operation, a visitor in the apartment lobby selects the apartment unit that he wishes to call. He does so by selecting the floor of the apartment building in which the apartment is located by a setting of the floor selector switch 310. To select the first floor he sets the selector to connect 304–1 to the central unit. He then selects the wing of the building, for example, wing B, by setting the riser 311 to energize the relay 307–2, thereby connecting the bundle of wires 309–2 to the unit selector 385. The visitor then selects the apartment unit number on the unit selector switch 385 to, for example, connect the positive line 383 to the right-most wire of the bundle 309–2 illustrated in the figure, and the negative line 382 to the left-most line of the bundle 309–2 illustrated in the figure. The visitor then depresses the ring switch which closes the switch contacts 381, 382 and 383. This causes a signal to pass through the OR-gate 390 to initiate the timer 391 and close the switch 392. This energizes the lines which are darkened in the figure to select the unit 302–12. This causes a current to pass through the emitter to base path of the transistor 325 in the remote unit to energize the relay winding 323 which closes the relay contacts 323', and connects the remote speaker 341 across the common audio lines 345. At the same time the ring oscillator 379 is keyed and a ring signal is applied to the common audio lines 345 through the amplifier 355 from the audio circuitry 350 which sounds on the speaker 341. The closing of the relay contacts 323' applies a DC ground to one terminal of the winding 323 by completing a circuit through the center tap 343 of the speaker winding 342, through the common audio lines 345, to the ground connection at the juncture of the resistors 371 at the central unit. This causes a holding current to flow through the relay 323 from the line 304–1 at the terminal 321 of the remote unit to hold the contacts 323' connecting the speaker 341 to the common audio lines 345.

If there is no answer from the remote unit within a specified time, the timer 391 at this control unit will open the switch 392, thereby removing the negative voltage from line 304–1 and breaking the holding current path through the relay 323, causing the relay contacts 323' to open, disconnecting the remote unit. If the occupant of the apartment which is called answers by energizing the talk-down switch 322, the control circuit 393 at the central unit will reset the timer through the control line 394 and the OR-gate 390, and will also de-energize the shunting switch 366' through the line 398 to connect the lobby speaker 362 to the audio circuit 350.

Figure 8:
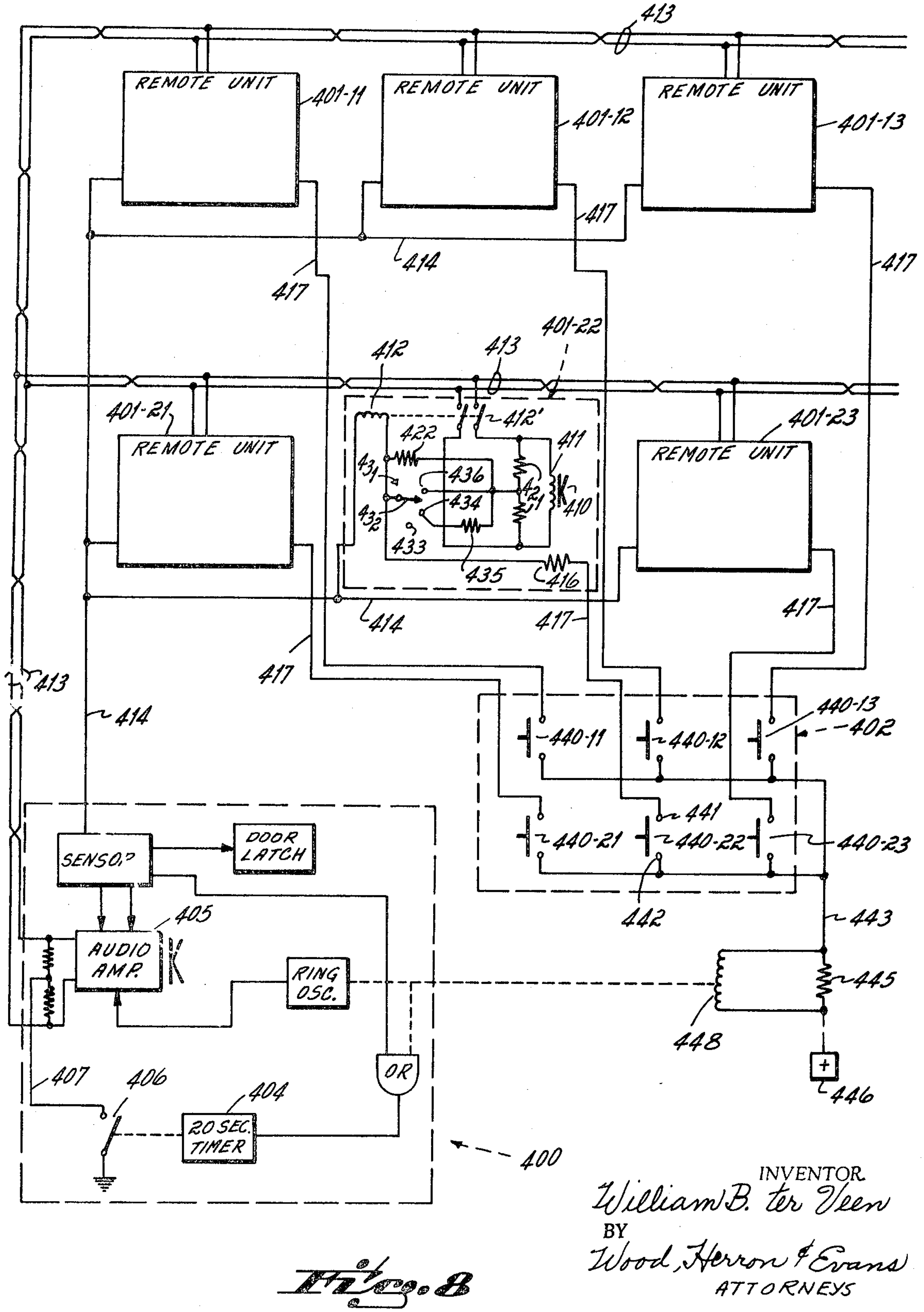
FIG. 8 is a partial schematic, partial block diagram of a common audio intercom system employing certain features of the intercom system of FIG. 7.

Referring to FIG. 8, an alternative embodiment of the system of FIG. 7 is illustrated. This embodiment employs a central unit 400, a plurality of remote units 401, and a selector 402. The central unit 400 has a timer 404 which operates to turn an audio amplifier 405 "on" and "off." This differs in the operation of the timer 391 of the FIG. 7 embodiment which controls a switch 392 in the selector power line. In all other respects, however, the central unit 400 of the embodiment of FIG. 8 is identical with the central unit of the embodiment of FIG. 7.

Each of the remote units 401 includes a two-way speaker 410 having a winding 411 connected through normally open contacts 412' of a relay winding 412 to a common audio line 413 which connects each of the remote units 401 with the central unit 400. The winding 412 which operates the contacts 412' is connected at one end to a negative bus line 414 and at the other end through a resistor 416 to a signalling line 417. Connected across the winding 411 of the speaker 410 is a balanced pair of resistors 421 connected in series. The juncture of the two resistors 421 is connected through a resistor 422 to the juncture of the winding 412 and the resistor 416. A control switch 431 is a three-position rotary switch connected across the resistor 422. The switch 431 includes a wiper contact 432, an open circuited contact 433, a contact 434 connected through a resistor 435 to the juncture of the resistors 421, and a contact 436 connected directly across the resistor 435. The resistance of the resistor 435 is preferably smaller than the resistance of the resistor 422 so that the switch 431 is effective to apply three different DC resistances between the juncture of the winding 412 and resistor 416 and the juncture of the resistors 421.

The selector 402 includes a plurality of normally open momentary push-button switches 440, one corresponding to each of the remote units 401. Each of the switches 440 has one terminal 441 connected to a control line 417 of a corresponding remote unit 401, and a terminal 442 connected to the positive bus line 443. The bus line 443 is connected through a resistor 445 to the positive voltage source 446. Connected across the resistor 445 is the relay winding 448.

In operation, a caller in the apartment lobby depresses one of the selector switches 440 of the selector 402 which corresponds to the remote unit 401 which he wishes to address. By doing so he closes the circuit from the negative bus line 414 through the winding 412 and resistor 416, through the signalling line 417, the switch 440, the positive bus line 443, and the relay winding 448 to the positive voltage source 446. This energizes the relay 448 which energizes the ring oscillator and the timer 404. The timer 404 closes the switch 406 in the common audio ground line 407. At the remote unit, the winding 412 is energized closing the contacts 412' connecting the winding 411 of the speaker 410 across the common audio lines 413. This causes the relay winding 412 to latch by completing a circuit from the negative bus line 414 through the winding 412, the resistor 422, the pair of resistors 421, and the common audio lines 413, to the audio ground line 407 through switch 406 to ground at the central unit 400.

If the occupant of the apartment unit responds while the timer 404 is still energized, conversation and remote control proceeds as it has in connection with the previous embodiments disclosed.

If there is no answer within the timer setting of, for example, twenty seconds, or if conversation, once started, has been absent from the audio lines 413 for that time, the switch 406 opens breaking the latching circuit of relay 412 of its remote units and causing the remote unit 401 to disconnect.

Figure 9:
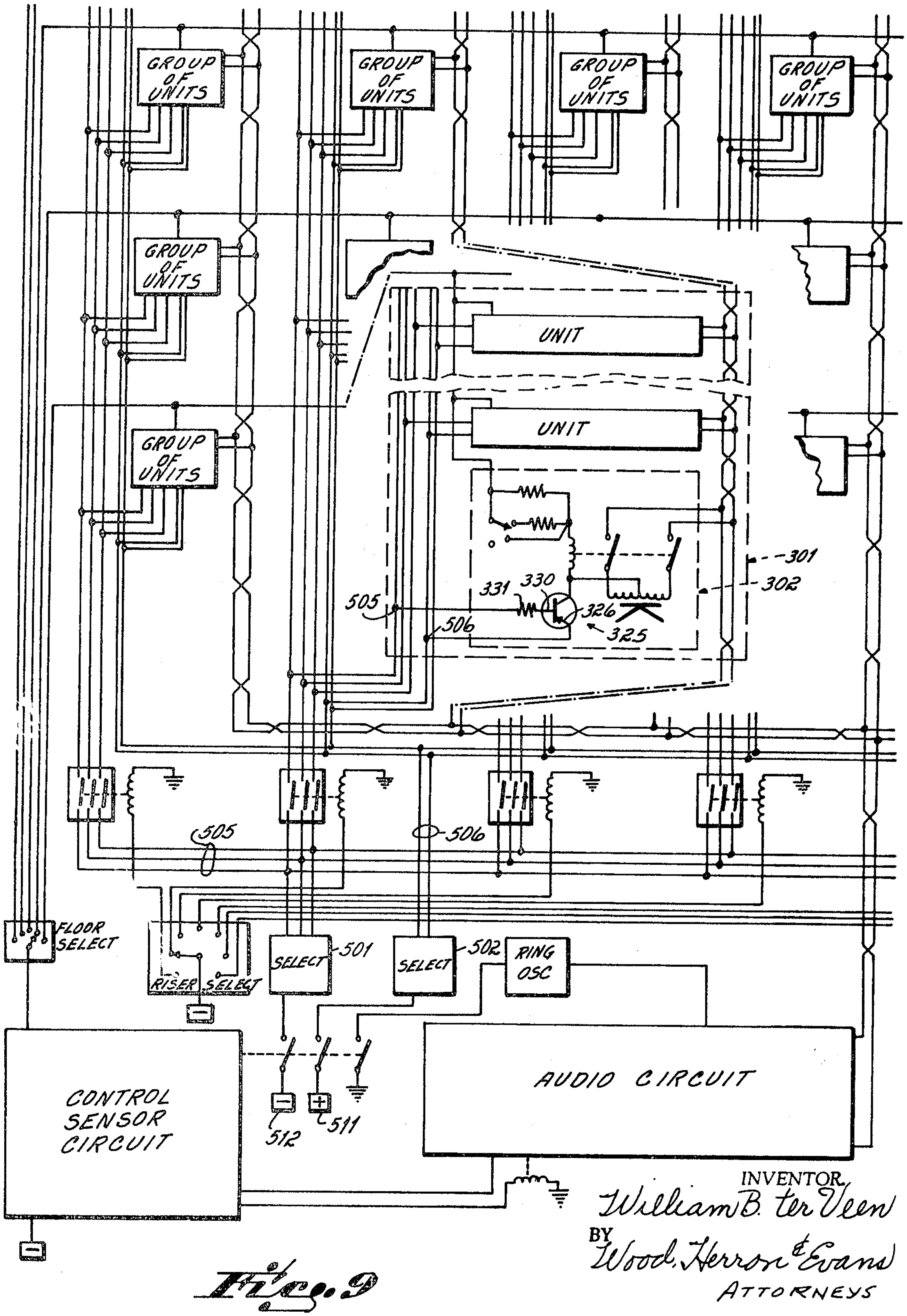
FIG. 9 is an alternative form of an intercom system according to FIG. 7 employing, particularly, an alternative selection system.

The embodiment of FIG. 9 is similar to the embodiment disclosed in FIG. 7. Instead of the selector 385 of FIG. 7, the embodiment of FIG. 9 employs a pair of selectors 501 and 502; and instead of the wire bundles 309 of FIG. 7, the embodiment of FIG. 9 employs a pair of bundles 505 and 506. The bundle 505 is made up of three wires, and the bundle 506 is made up of two wires. At the remote unit 302, the zener diode 333 of FIG. 7 is not employed in FIG. 9 embodiment. Instead, the emitter 326 of the transistor 325 is always connected to a wire of the bundle 506 while the base 330 of the transistor 325 is always connected through a resistor 331 to a wire of the bundle 505. Thus, in the embodiment of FIG. 9, the polarity on the wires is always the same, the selector 502 connecting the wires of bundle 506 only to the positive voltage source 511 while the selector 501 connects wires of the bundle 505 only to the negative voltage source 512.

In all other resects, the system of FIG. 9 is identical to the system of FIG. 7.

While the system of FIG. 9 employs more wires than the system of FIG. 7, it has other advantages, particularly, the approach of the FIG. 9 system is more straightforward and the system is easier to install.

Figure 10:
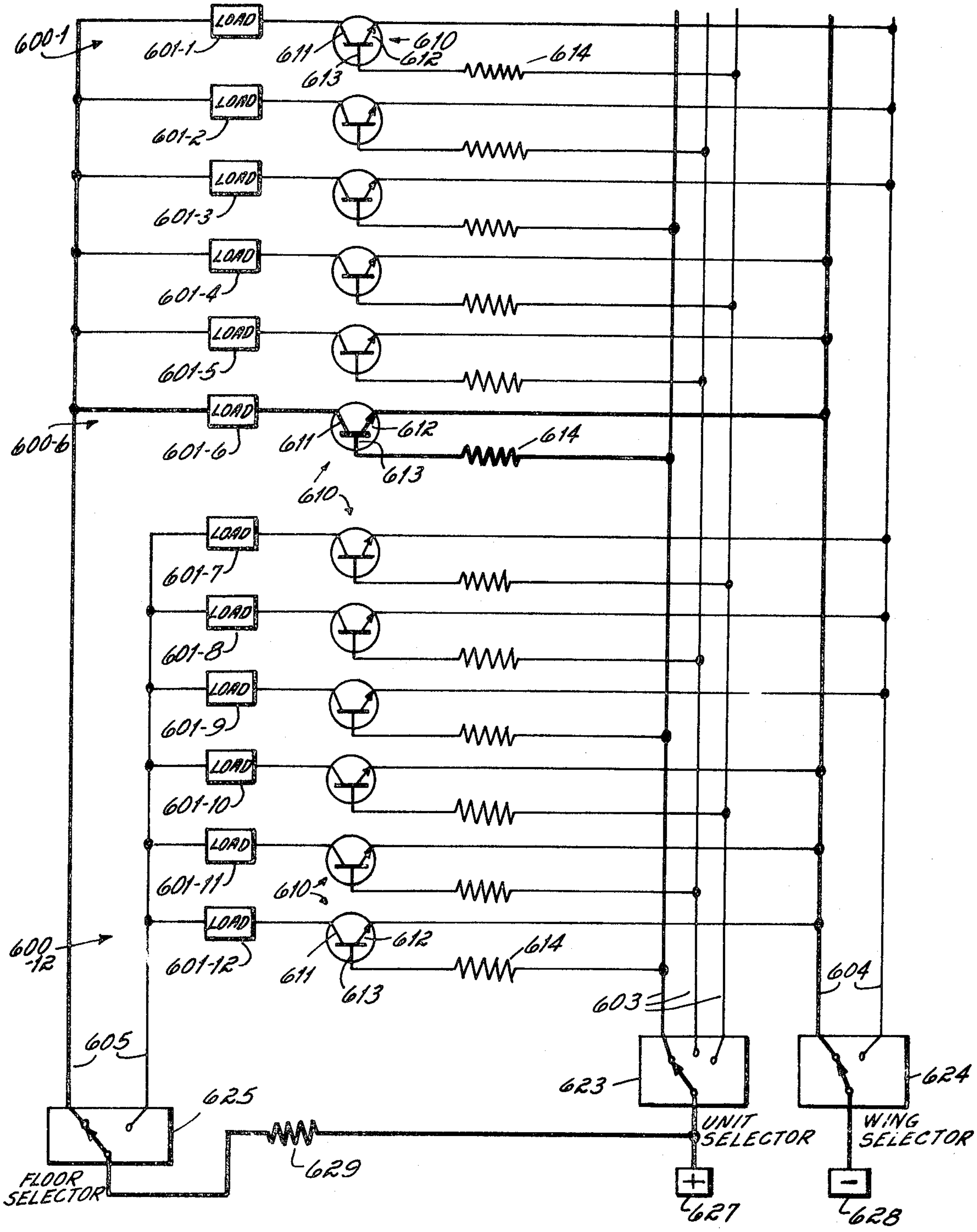
FIG. 10 is a simplified schematic diagram of the selection circuit of the system of FIG. 9.

The unit selection system of FIG. 9 is illustrated in a more general form in the schematic diagram of FIG. 10. Referring to FIG. 10, a plurality of loads 601–1 through 601–12 are provided, each corresponding to a different remote unit. The selection system includes three sets of wires 603, 604 and 605 which are connected in the form of a three-dimensional matrix. At each remote unit, the load 601 is connected between one of the leads 605 and the collector 611 of an NPN transistor 610. The emitter 612 of the transistor 610 is connected to one of the wires of the set 604. The base 613 of the transistor is connected through a resistor 614 to one of the wires of the set 603. Each of the remote units 600 is connected to a different combination of the wires of the sets 603, 604 and 605. Selection of the remote unit is provided by connection of one of the wires of each of the sets 603, 604 and 605 to a voltage source by actuation of the three selector switches 623, 624 and 625, respectively. The selector 623 connects one of the wires 603 to the positive voltage source 627, while the slector 624 connects one of the wires of the set 604 to a negative voltage terminal 628. The selector 625 connects one of the wires of the set 605 through a resistor 629 to the positive voltage source 627. Thus, when the selectors 623, 624 and 625 are in the positions illustrated in the figure, one wire of each of the sets 603, 604 and 605 is energized as illustrated by the darkened conductors in FIG. 10. When these wires are so energized, only one of the remote units, 600–6, is connected across the conductors in a manner which will enable it to be conductive. Thus, the load 601–6 of the unit 600–6 is energized. This load 601–6 might be, for example, the relay coil 412 of the remote unit 401 of FIG. 8, or may be a speaker winding such as a winding 152 of a speaker 153 in the system of FIG. 4.

While the system of FIG. 10 does employ more wires than the selection system of FIG. 6, for example, it does require substantially less wires than most systems of the prior art. An additional advantage of this system is that the selection arrangement provides easy installation in many apartment buildings in that the groups of wires can be simply and logically assigned to certain physical areas of the apartment building. For example, the selector 625 can be used to select the floor of the apartment building, while the selector 624 can be employed to select the wing of the apartment building. The selector 623, therefore, can be used to dial the room number on that given floor in a given wing.

Figure 11:
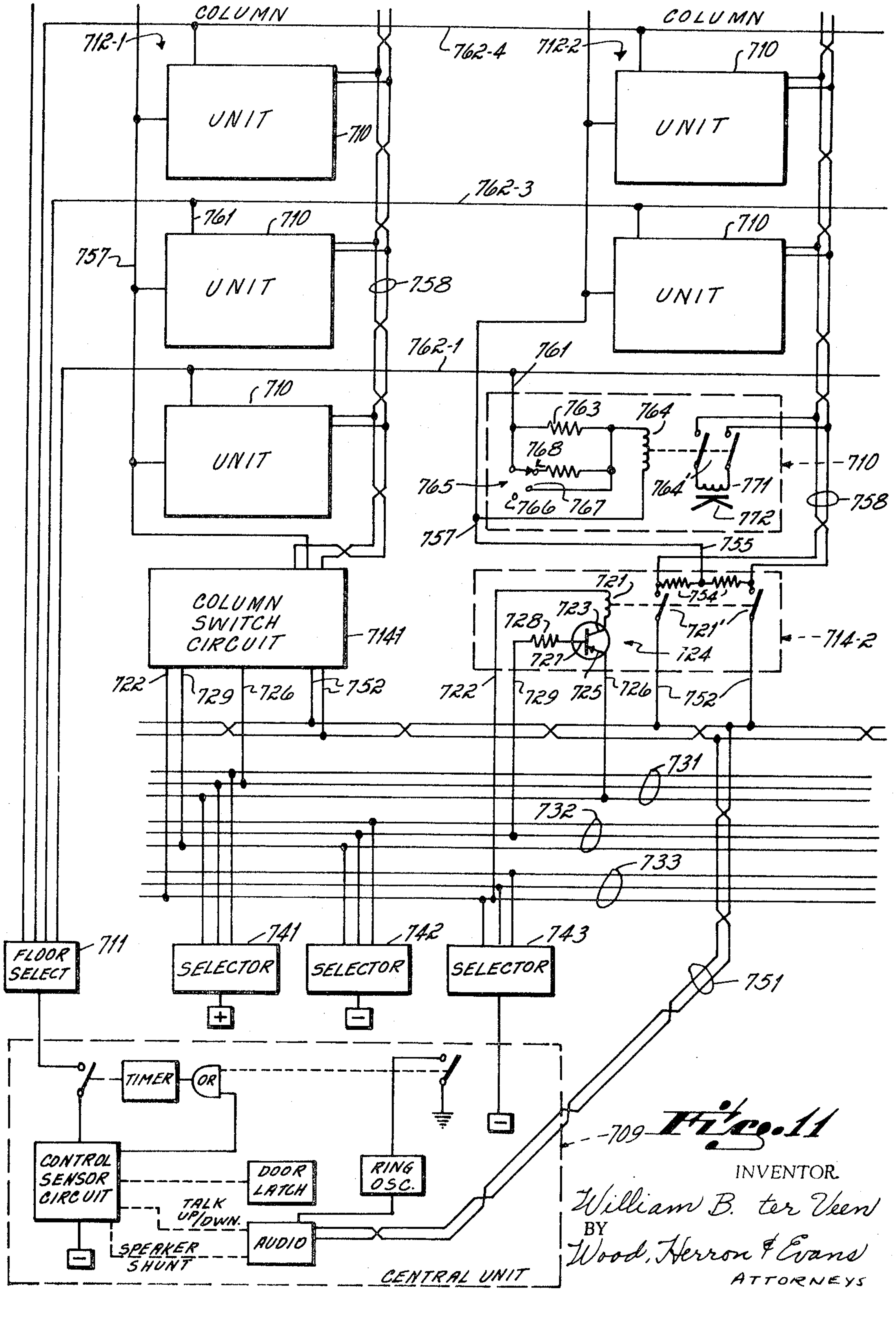
FIG. 11 is an alternative embodiment of an intercom system embodying principles set forth in FIG. 7.

The intercom system illustrated in FIG. 11 incorporates the selection system of FIG. 10 as a "visor" selector in a large apartment building. The system is illustrated for an apartment house having multiple floors of identical floor plans. The central unit 709 is identical to the central unit of FIG. 9. A floor selector switch 711 is provided. The apartments are grouped in single columns 712–1, 712–2 . . . of apartment units 710. These groups 712 include one apartment unit 710 on each of the floors of the apartment building. Selection of a unique apartment unit 710 is made by selection of one of the floors of the apartment building by the selector switch 711 and selection of one of the columns 712. Column selection is achieved by actuation of one of the column switch circuits 714 located at the base of each of the columns 712. Each of the units 714 includes a relay winding 721 connected at one end to a terminal 722 of the switch circuits 714 and at the other end to the collector 723 and a PNP transistor 724. The emitter 725 of a transistor 724 is connected to a terminal 726 of the switch circuit 714. The base 727 of the transistor 724 is connected through a resistor 728 to terminal 729 of the switch circuit 714. The terminals 726, 729 and 722 are connected to unique combinations of wires 731, 732 and 733, respectively. These selectors are effective to apply a positive voltage to one of the wires 731, and the transistor emitters 725, a negative voltage to one of the wires 732 and the base 727 of the transistor 724, and a negative voltage to the collector 723 of the transistor 724. When one wire of each of the groups is energized, the one of the units 714 that is connected across those three wires will be actuated to activate one of the columns 712. Selection of the wires of the sets 731, 732 and 733 is achieved by the selector switches 741, 742 and 743, respectively, located in the apartment lobby.

The common audio lines 751 connect to terminals 752 at each of the column switches 714. Within the column switches 714, a pair of switches 721′ are connected in series with the common audio lines. These switches are the contacts of the relay winding 721. A pair of balanced column common audio lines 758 extend up the column 712 from the switches 721′, series resistors 754 are connected across the common audio line at each of the remote units 714 at a point just above the switches 721′. The common juncture 755 of these resistors 754 is connected to a column selection line 757 which extends upward with the column common audio lines 758 and connects to each of the remote units 710 of the respective column 712.

Each of the remote units 710 has a terminal 761 connected to one of the set of floor lines 762. The terminal 761 is connected internally of the remote unit 710 through a resistor 763 to one terminal of the relay winding 764. The other terminal of the relay winding 764 is connected to the column line 757. Connected across the resistor 763 is a selector switch 765 which is connectable to one open terminal 766, a straight line contact 767, and another terminal connected through a resistor 768. The switch is used to vary the DC impedance across the resistor 763 for purposes of applying control signals to the central unit 709. The relay 764 actuates a pair of contacts 764′, one of which is connected between each of the leads of the winding 771, remote unit speaker microphone 772 and the common audio lines 758. In operation, the selectors 741, 742 and 743 are set to select a column 712 which energizes the transistor 724 and the relay winding 721 of the column switch 714, closing the contacts 721′. The floor selector 711 is set to select a floor of the apartment building. The call button is depressed to actuate the ring button also connecting the floor selector 711 to the negative voltage source.

When the column selector switch 714 is actuated, the relay 721 is actuated and the common audio lines of that column are connected to the amplifier of a central unit 709. This grounds the riser line 757 through the resistors 754 and the audio lines 751, which are grounded through the audio amplifier. When the line 757 is grounded, the one of the apartment units 710 in the column 712 which is connected through the floor selector unit 711 will have a circuit closed through the relay winding 764, thereby actuating the relay and connecting the remote speaker winding 771 to the common audio line 758. The unit will disconnect only by shut-down timer at the central unit.

Talk-up and talk-down controls as well as door latch actuation are accomplished by selection of the switch 765. This is done in much the same manner as described in connection with the above systems.

I claim:

1. A multi-unit intercom system for communicating with an audio signal between a central unit and any one of a plurality of remote units, said system comprising:

a set of conductors;

said central unit and each of said remote units having a first terminal and a second terminal and a two-way audio circuit connected between said first and second terminals of said units;

the terminals of each of said remote units being connected across unique pairs of conductor's of said set;

selection means for selectively connecting the first and second terminals of said central unit each to a different conductor of said set to complete a two-way communications path through the audio circuits of the selected remote unit and said central unit and along the unique pair of wires connecting said selected remote unit;

signaling means at each of said remote units for applying a control signal across the first and second terminals of said remote unit;

control means at said central unit for initiating a control operation at said central unit in response to the control signal from the selected remote unit; and a reversible audio amplifying unit connected to the audio circuit of said central unit; and said control means being operative to control the direction of said reversible amplifying unit.

2. An intercom system according to claim 1 wherein:

said set of conductors includes a first group of conductors connected only to the first terminals of said remote units and a second group of conductors connected only to the second terminals of said remote units;

said selection means includes means for connecting the first terminal of said central unit to one of the conductors of said first group and means for connecting said second terminal of said central unit to one of the conductors of said second group.

3. An intercom system according to claim 2 wherein said system further comprises:

a uni-directional circuit element connected in the same orientation in each of said remote units and in series with the audio circuit of said remote unit to permit current to flow only in a direction from said first to said second terminal of each of said remote units; and means at said central unit for applying a DC bias potential across the terminals of said central unit, said bias means including a positive lead connected to the first terminal of said central unit and a negative lead connected to said second terminal of said central unit;

whereby, only the selected one of said remote units is rendered conductive to an audio signal.

4. An intercom system according to claim 1 further comprising:

a releasable door latch at said central unit;

said control means at said central unit being operative to release said door latch in response to a control signal from said selected remote unit.

5. An intercom system according to claim 1 wherein:

said signaling means at said remote unit includes means for varying a DC voltage at said central unit; and said control means at said central unit includes means responsive to a DC voltage level change to initiate said control operation.

6. An intercom system according to claim 5 wherein each of said remote units comprises:

a speaker coil and a capacitor connected in series in said audio circuit; and a variable resistance network connected in parallel across said audio circuit and including switching means operative to selectively connect different resistances into said resistive network to vary the DC impedances across the terminals of said remote unit.

7. An intercom system according to claim 5 wherein each of said remote units comprises:

a variable resistance network connected between the terminals of said remote unit and including switching means operative to selectively connect different resistances into said resistive network to vary the DC impedances across the terminals of said remote unit.

8. An intercom system according to claim 1 further comprising:

means at said central unit for applying a call signal across the terminals of said central unit;

means connected at said central unit operative to interrupt said communications path between said central and selected remote unit;

time delay control means operatively connected to said interrupting means to close the communications path in response to a reset signal and to break said communications path at some predetermined time sufficient for a response to some signal from said remote unit.

9. An intercom system according to claim 5 wherein said control means at said central unit is responsive to the timed duration of a control signal from said remote unit to initiate a control function.

10. An intercom system according to claim 1 further comprising:

a sneak path preventing circuit at each of said remote units, including a uni-directional conducting device and a zener diode reverse connected in series with said uni-directional conducting device and said audio circuit;

said sneak path preventing circuit being oriented to permit conduction only from said first to said second terminal of each of said remote units;

conductors of said set being connected to the first terminal of some of said remote units and to the second terminals of others of said remote units.

11. An intercom system according to claim 10 further comprising:

means at said central unit for applying a bias voltage across the terminals of said central unit, said bias voltage being from one to two times the reverse voltage of said zener diodes, whereby said bias voltage is sufficient to complete a path through one and only one of said remote units.

12. An intercom system according to claim 11 wherein said bias voltage is from:

one time the reverse voltage of the zener diodes plus the amplitude of said audio signal, to: two times the reverse voltage of said zener diodes minus the amplitude of said audio signal.

13. An intercom system according to claim 11 wherein:

said selector means is effective to connect a unique remote unit in a communication path with said central unit by uniquely applying a signal of a given polarity across a selected pair of conductors of said set.

14. A multi-unit intercom system for communicating with an audio signal between a central unit and any one of a plurality of remote units, said system comprising:

a first set of conductors;

each of said units having a first terminal and a second terminal;

the terminals of each of said remote units being connected across a different pair of conductors of said first set so as to provide a unique conductive path therebetween;

some of said conductors being connected to the first terminal of at least one remote unit and a second terminal of at least one other remote unit;

first selection means for selectively connecting the terminals of said central unit each to a different conductor of said set of a selected remote unit and said central unit;

a potential source connectable across the terminals of said central unit;

a sneak path preventing circuit at each of said remote units, including a uni-directional conducting device and a zener diode reverse connected in series between the terminals of each of said remote units; and said sneak path preventing circuit being oriented to permit conduction only from said first to said second terminal of each of said remote units.

15. An intercom system according to claim 14 wherein:

the potential of said potential source is from one to two times the reverse voltage of said zener diodes, whereby said potential is sufficient to cause a conductive path to be completed through one and only one of said remote units.

16. An intercom system according to claim 15 wherein:

each of said remote units includes an audio circuit connected between the terminals of each of said remote units; and said potential is from: one times the reverse voltage of said zener diodes plus the amplitude of said audio signal to: two times the reverse voltage of said zener diodes minus the amplitude of said audio signal.

17. An intercom system according to claim 16 wherein:

said audio circuit of each of said units is connected in series with the zener diode, and the unidirectional conducting device thereof.

18. An intercom system according to claim 15 wherein:

said system is effective to connect a specified unique remote unit in a communication path with said central unit by uniquely applying a signal of a given polarity across the combination of two conductors of said set to which said specified unique remote unit is connected, whereby said specified unique remote unit becomes said selected remote unit.

19. An intercom unit according to claim 14 further comprising:

a pair of audio conductors extending from said central unit to each of said remote units;

said central unit including an audio circuit connected between said audio conductors;

each of said remote units including an audio circuit, a load connected in series with said zener diode and said unidirectional conducting device, and switching means for connecting said audio circuit to said audio conductors when said load is energized.

20. An intercom system according to claim 14 wherein:

the unidirectional conducting device of each of said remote units being the base to emitter path of a transistor;

each of said remote units including a third terminal, the collector of said transistor being connected to said third terminal;

said central unit including a third terminal and conductor means for interconnecting said central unit third terminal and the third terminal of said remote unit, and said potential source is further connectable between said central unit third terminal and one of said first and second terminals of said central unit.

21. A system according to claim 20 wherein said conductor means includes:

a second set of conductors, each of the conductors of said second set being connected to the third terminals of different groups of remote units; and second selection means for connecting said third terminal of said central unit with a selected one of the conductors of said second set.

22. An intercom system according to claim 21 wherein:

each of those remote units which have their third terminals connected to the same one of the conductors of the said second set, has its first and second terminals connected in a unique current conducting path across a combination of two of the conductors of said first set.

23. An intercom system according to claim 21 wherein:

said first set of conductors includes a plurality of identical sub-sets of conductors;

each of said sub-sets of conductors having different sets of remote units connected thereto; and said first selection means including switching means for selectively connecting said sub-sets of conductors to said central unit terminals.

24. An intercom system according to claim 14 wherein each of said units includes an audio circuit, and the system further comprises:

calling means at said control unit for momentarily connecting said potential source across said central unit first and second terminals; and latching means at each of said remote units operative to connect the audio circuit of the selected remote unit to the audio circuit of said central unit in response to a potential being applied across the terminals of said selected remote unit.

25. An intercom system according to claim 24 further comprising:

a pair of audio conductors separate from the conductors of said sets for connecting the audio circuits of each of said remote units in parallel across the audio circuit of said central unit.

26. An intercom system according to claim 25 wherein:

said latching means includes a holding circuit through said audio conductors.

27. An intercom system according to claim 26 wherein:

each of said remote units includes a selective impedance network for varying the impedance between two of the terminals of the remote unit to generate control signals to said central unit.

28. An intercom system according to claim 27 wherein:

said central unit includes a knock-down timer operative to break said holding circuit at a predetermined delay time after said timer has been set, said timer being set in response to the operation of said calling means and in response to certain of said control signals.

29. An intercom system according to claim 27 wherein:

said central unit includes a reversible audio amplifying unit responsive to certain control signals from said remote unit to establish its direction of operation.

30. An intercom system according to claim 27 wherein:

said central unit includes means for disabling said central unit audio circuit until certain signals from said remote unit are received at said central unit.

31. An intercom system according to claim 14 wherein each of said units includes an audio circuit and said system further comprises:

calling means, at said central unit, including normally opened momentary switch means connected in series with said potential source between the first and second terminals of said central unit;

a pair of audio conductors connecting the audio circuits of each of said remote units across the audio circuit of said central unit;

a normally opened switch, at each of said remote units, connected between the remote unit audio circuit and said audio conductors;

a switch actuating circuit, at each of said remote units, connected between the remote unit first and second terminals,and being energized to close said switch when said switch means of said calling means is closed;

a holding circuit for energizing the switch actuating circuit of a remote unit when the remote unit switch is closed, said holding circuit including means connecting the actuating circuit with the remote unit audio circuit at each remote unit and means connecting the central unit audio circuit with the potential source; and means for breaking said holding circuit to open said switch.

32. An intercom system for communicating with an audio signal between a central unit and any one of a plurality of remote units, each having an audio circuit, said system comprising:

a first set of conductors;

each of said units having a first terminal and a second terminal;

each of said remote units having its terminals connected across a different pair of conductors of said first set;

a potential source connected between the first and second terminals of said central unit;

calling means including normally opened switch means for selectively connecting said source between conductors of said first set to thereby apply an energizing potential across the first and second terminals of the selected remote unit;

a pair of audio conductors connecting the audio circuits of each of said remote units across the audio circuit of said central unit;

a normally opened switch, at each of said remote units, connected between the remote unit audio circuit and said audio conductors;

a switch actuating circuit, at each of said remote units, connected between the remote unit first and second terminals, and being energized to close said switch when said switch means of said calling means is closed;

a holding circuit for energizing the switch actuating circuit of a remote unit when the remote unit switch is closed, said holding circuit including means connecting the actuating circuit with the remote unit audio circuit at each remote unit and means connecting the central unit audio circuit with the potential source; and means for breaking said holding circuit to open said switch.

33. An intercom system according to claim 32 wherein:

said central unit has a third terminal, each of said remote units includes a third terminal and a relay;

third terminal conductor means for connecting said third terminal of said remote unit to the third terminal of said central unit;

each of said switch actuating circuits includes a transistor and the winding of said relay, said relay winding being connected between said third terminal and the collector of said transistor;

the base of said transistor is connected to the second terminal of said remote unit and the emitter of said transistor is connected to the first terminal of said remote unit; and said switch includes the contacts of said relay.

34. An intercom system according to claim 33 wherein:

said first set of conductors includes a first sub-set of conductors connected to the first terminals of said remote units and a second sub-set of conductors connected to the second terminals of said remote units; and said system further comprises a first selector for selectively connecting the first terminal of said central unit with a conductor of said first sub-set, and a second selector for selectively connecting the second terminal of said central unit with a conductor of said second set.

35. An intercom system according to claim 34 further comprising:

said third terminal conductor means which includes a third sub-set of conductors connected to the third terminals of said remote units; and a third selector for selectively connecting the third terminal of said central unit with a conductor of said third sub-set.

36. An intercom system according to claim 35 wherein:

one of said sub-sets includes a plurality of groups of conductors connected to different groups of remote units, and said system further includes a group switch for connecting said group of conductors to the corresponding sub-set selector; and said system includes a fourth selector for selectively actuating one of said group switches.

37. An intercom system according to claim 32 wherein:

the switch means of said calling means includes a set of momentary switches each connected between one terminal of said central unit and the first terminal of a different one of said remote units.

38. An intercom system for communicating with an audio signal between a central unit and any one of a plurality of remote units, wherein:

each of said units includes a first terminal, a second terminal, a third terminal, and an audio circuit;

said central unit includes an audio circuit, and a potential source connectable from said first terminal to said second and third terminals;

each of said remote units includes a transistor switch for connecting the remote unit audio circuit to the audio circuit of said central unit, said transistor having its emitter connected to the remote unit first terminal, its base connected to the remote unit second terminal, and its collector connected to the remote unit third terminal;

said system includes a first set of conductors connecting to the first terminals of said remote units, a second set of conductors connecting to the second terminals of said remote units, and a third set of conductors connecting to the third terminals of said remote units; and said system further includes a first selector for connecting one conductor of said first set to the first terminal of said central unit, a second selector for connecting one conductor of said second set to the second terminal of said central unit, and a third selector for connecting one conductor of said third set to the third terminal of said central unit.

39. An intercom system according to claim 38 wherein:

the different conductors of one of said sets correspond to different floors of an apartment building.

40. An intercom system according to claim 38 further comprising:

a plurality of remote termination units arranged in groups and each having an audio circuit;

said first recited remote units being remote switching units operable, when energized, to connect the audio circuits of the termination units of a unique one of said groups to the audio circuit of said control unit, a fourth set of conductors;

each of said remote termination units having a first terminal and a second terminal, a normally-opened switch connected in the termination unit audio circuit, and means connecting between the remote termination unit first and second terminals operative when energized to close said switch;

each of the conductors of said fourth set being connected to the first terminal of one remote termination unit of each of said groups;

the second terminals of each of said remote termination units of each group being interconnected;

said central unit having a fourth terminal, a potential source being connected between said fourth terminal and the audio circuit of said central unit; and a fourth selector for selectively connecting said central unit fourth terminal to one of the conductors of said fourth set.

41. An intercom system according to claim 40, wherein:

the conductors of said fourth set correspond to different floors of an apartment building;

said system further comprising a plurality of switches and each corresponding to vertical columns of apartment units each operable in response to a unique combination of settings of said first, second and third selectors, each unit being located on a different floor of the apartment building.

42. An intercom system for communicating with an audio signal between a central unit and any one of a plurality of remote units, each of said units having an audio circuit, said system comprising:

a plurality of switch units, each having a first terminal, a second terminal, and a third terminal, each of said switch units being actuated when all of the three terminals thereof are energized;

each of said switch units being operable when actuated to connect the audio circuits of a unique group of remote units to the audio circuit of said central unit; and selection means for selectively actuating said switch units by selectively energizing all of the three terminals of a selected one of said switch units.

43. An intercom system according to claim 42 wherein:

said central unit includes a first terminal, a second terminal, and a third terminal;

said central unit includes a potential source connectable between said first terminal and both said second and third terminals;

each of said switch units includes a transistor switch operative when energized to actuate said switch unit to connect the audio circuits of the selected group of remote units to the audio circuit of said central unit, said transistor having its emitter connected to the switch unit first terminal, its base connected to the switch unit second terminal, and its collector connected to the switch unit third terminal;

said system includes a first set of conductors connecting to the first terminals of said switch units, a second set of conductors connecting to the third terminals of said switch units, and a third set of conductors connecting to the third terminals of said switch units; and said system further includes a first selector for connecting one conductor of said first set to the first terminal of said central unit, a second selector for connecting one conductor of said second set to the second terminal of said central unit, and a third selector for connecting one conductor of said third set to the third terminal of said central unit.

44. An intercom system according to claim 43 further comprising:

a fourth set of conductors;

each of said remote units having a first terminal and a second terminal, a normally opened switch connected in the remote unit audio circuit, and means connecting between the remote unit first and second terminals operative when energized to close said switch;

each of the conductors of said fourth set being connected to the first terminals of remote units of different groups of remote units;

the second terminals and the audio circuits of each of said remote units being interconnected;

said central unit having a fourth terminal and means for applying potential between said fourth terminal and the audio circuit of said central unit; and a fourth selector for selectively connecting said central unit fourth terminal to one of the conductors of said fourth set.

45. An intercom system according to claim 44, wherein:

the conductors of said fourth set correspond to different floors of an apartment building and the riser switches correspond to vertical columns of apartment units, each located on a different floor of the apartment building.

* * * * *